(12) United States Patent
Yasuda

(10) Patent No.: US 8,189,208 B2
(45) Date of Patent: May 29, 2012

(54) IMAGE PROCESSING APPARATUS, CONTROLLING METHOD OF IMAGE PROCESSING APPARATUS, PROGRAM AND STORAGE MEDIUM

(75) Inventor: Masataka Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1186 days.

(21) Appl. No.: 11/965,937

(22) Filed: Dec. 28, 2007

(65) Prior Publication Data

US 2008/0285069 A1     Nov. 20, 2008

(30) Foreign Application Priority Data

May 14, 2007    (JP) ................................. 2007-127533

(51) Int. Cl.
*G06F 3/12*          (2006.01)

(52) U.S. Cl. ...... 358/1.13; 358/1.15; 358/1.9; 358/1.11; 358/1.12; 709/229; 379/100.08; 379/100.09; 379/100.11

(58) Field of Classification Search ................ 358/1.18, 358/1.19
See application file for complete search history.

(56) References Cited

U.S. PATENT DOCUMENTS

2005/0137977 A1*   6/2005   Wankmueller ................. 705/40

\* cited by examiner

*Primary Examiner* — Twyler Haskins
*Assistant Examiner* — Brendan McCommas
(74) *Attorney, Agent, or Firm* — Fitzpatrick, Cella, Harper & Scinto

(57) ABSTRACT

The present invention provides an image processing apparatus, a method of controlling the image processing apparatus, a program and a storage medium that can increase security strength of encoded data, printed on a recording medium. According to an embodiment of the present invention, an image to be a document is read and is subjected to image processing, and thereby digital data is acquired. Next, the above-described digital data is encoded to generate a first encoded data. Next, information on a process of decoding the digital data from the first encoded data is encoded to generate second encoded data.

11 Claims, 17 Drawing Sheets

IMAGE PROCESSING APPARATUS, CONTROLLING METHOD OF IMAGE PROCESSING APPARATUS, PROGRAM AND STORAGE MEDIUM

BACKGROUND OF THE INVENTION

1. Field of the Invention

The present invention relates to image processing apparatuses, methods of controlling an image processing apparatus, and programs therefor, and more specifically relates to an image processing apparatus, a method of controlling the image processing apparatus, a program and storage medium that can handle paper fingerprint information and encode electronic data.

2. Description of the Related Art

It has been put into practical use that in a digital copying machine or a digital multifunctional apparatus, image data and the like read from a scanner are encoded using a two-dimensional bar code or another encoding means and then this encoded data is printed out as image data. The data to be encoded includes electronic data of various types, such as text, graphic image, and audio, transmitted from an external host computer, in addition to the above-described data.

It has also been put into practical use that the encoded image data printed as described above is read from a recording media, such as a paper, and then is converted into electronic data of various types, such as text, graphic image, and audio, and using this electronic data, printing is performed in a digital copying machine or a digital multifunctional apparatus. It has also been put into practical use that in addition to printing out the above-described electronic data, this electronic data is transferred to an external host computer, or other digital copying machine or digital multifunctional apparatus.

However, when converting the encoded data into electronic data of various types, such as text, graphic image, and audio, and then using this electronic data for printing in a digital copying machine or a digital multifunctional apparatus, a problem to be solved remains as follows.

That is, if printed data encoded by a two-dimensional bar-code or the like, is read as a document and copied onto a recording media, such as another paper, in a digital copying machine or a digital multifunctional apparatus, then the above-described encoded data is copied as well. There is thus a problem that even another person different from a user who printed an original document can convert the encoded data included in the document into electronic data and easily view or use this electronic data if he/she has this copied document.

SUMMARY OF THE INVENTION

The present invention provides an image processing apparatus a method of controlling the image processing apparatus, a program and a storage medium that can increase security strength of the encoded data that is printed on a recording medium.

In a first aspect of the present invention, there is provided an image processing apparatus, comprising: first means for encoding electronic data to generate first encoded data; and second means for encoding information about a process of decoding said electronic data from said first encoded data, to generate second encoded data.

In a second aspect of the present invention, there is provided an image processing apparatus capable of decoding electronic data from image data including first encoded data generated by encoding said electronic data, and second encoded data generated by encoding information about a process of decoding said electronic data from said first encoded data, said image processing apparatus comprising: extraction means for extracting, based on said image data, fingerprint information of a recording medium from which said image data was read; analyzing means for analyzing said second encoded data; collating means for collating said extracted paper fingerprint information with collation paper fingerprint information when it is determined, as a result of analysis by said analyzing means, that a collating process of said extracted paper fingerprint information is required; and allowing means for allowing decoding of said electronic data from said first encoded data when a result of collation by said collating means indicates coincidence between the extracted paper fingerprint information and the collation paper fingerprint information.

In a third aspect of the present invention, there is provided a method of controlling an image processing apparatus capable of decoding electronic data from image data including: first encoded data generated by encoding said electronic data; and second encoded data generated by encoding information about a process of decoding said electronic data from said first encoded data, said method comprising the steps of: extracting, based on said image data, paper fingerprint information of a recording medium from which said image data was read; analyzing said second encoded data; collating said extracted paper fingerprint information with collation paper fingerprint information when it is determined, as a result of analysis by said step of analyzing, that a collating process of said extracted paper fingerprint information is required; and allowing decoding of said electronic data from said first encoded data when a result of collation by said step of collating indicates coincidence between the extracted paper fingerprint information and the collation paper fingerprint information.

Note that "recording medium" of the present invention refers to not only a paper used in an ordinary recording apparatus, but also a cloth, a plastic film, and the like that can accept ink or toner to form an image.

The present invention can increase security of those acquired by encoding electronic data, which is printed on a recording medium, such as a paper, and printing the encoded data as an image onto a recording medium, such as a paper.

Further features of the present invention will become apparent from the following description of exemplary embodiments (with reference to the attached drawings).

DESCRIPTION OF THE EMBODIMENTS

Figure 1:
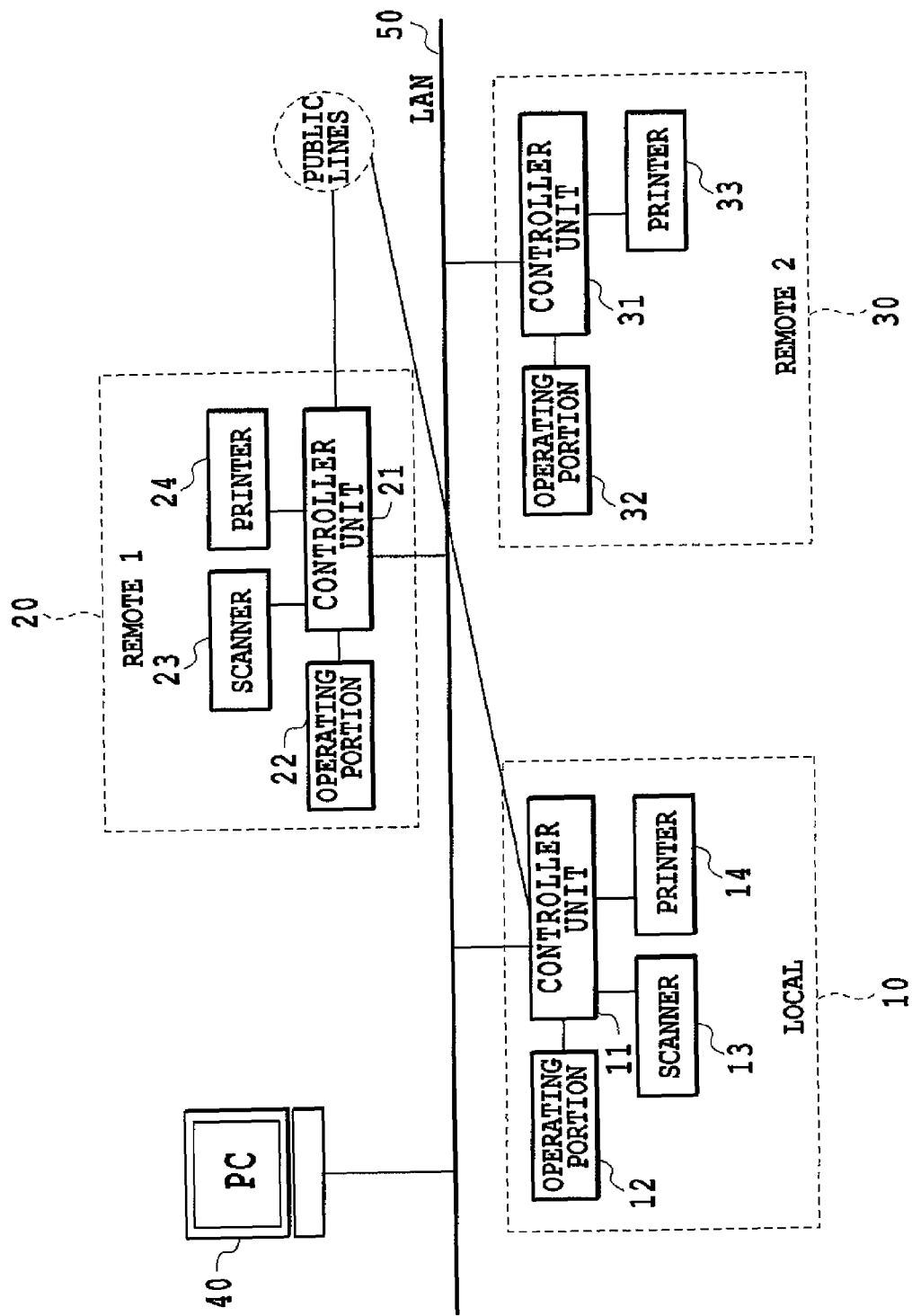
FIG. 1 is a view showing an entire configuration of an image forming system concerning an embodiment of the present invention.

Hereinafter, embodiments of the present invention will be described in detail with reference to the accompanying drawings. Note that, in the drawings described below, a component having the same function is given the same reference numeral and the duplicated description will be omitted.

First Embodiment

Printing System

Hereinafter, a first embodiment will be described in detail with reference to the accompanying drawings.

FIG. 1 is a block diagram showing a configuration of a printing system concerning this embodiment. Although in this system a host computer 40 and three image forming apparatuses (10, 20, and 30) are connected to a LAN 50, the number of units connected to the printing system in this embodiment is not limited to three. Further, although a LAN is employed in this embodiment, no limitation is placed on the connection method used. For example, any network, such as a WAN (a public line), a serial transmission method, such as USB, or a parallel transmission method, such as Centronics or SCSI, may also be employed.

The host computer (hereinafter, referred to as a PC) 40 has functions of a personal computer. The PC 40 can transmit and receive files or e-mails using a FTP or a SMB protocol via the LAN 50 or WAN. The PC 40 can also transmit a print command to the image forming apparatuses 10, 20, and 30 via a printer driver.

The image forming apparatuses 10 and 20 have the same configuration, and are MFP (Multi Function Printer), for example. The image forming apparatus 30 includes only a printing function and does not include a scanner unit which the image forming apparatuses 10 and 20 include. Hereinafter, for simplicity of description, focusing on the image forming apparatus 10 out of the image forming apparatuses 10 and 20, the configuration thereof will be described in detail.

The image forming apparatus 10 includes: a scanner unit 13, which is an image input device; a printer unit 14, which is an image output device; a controller unit 11, which controls the entire image forming apparatus 10; and an operating portion 12, which serves as a user interface (UI).

<Image Forming Apparatus 10>

Figure 2:
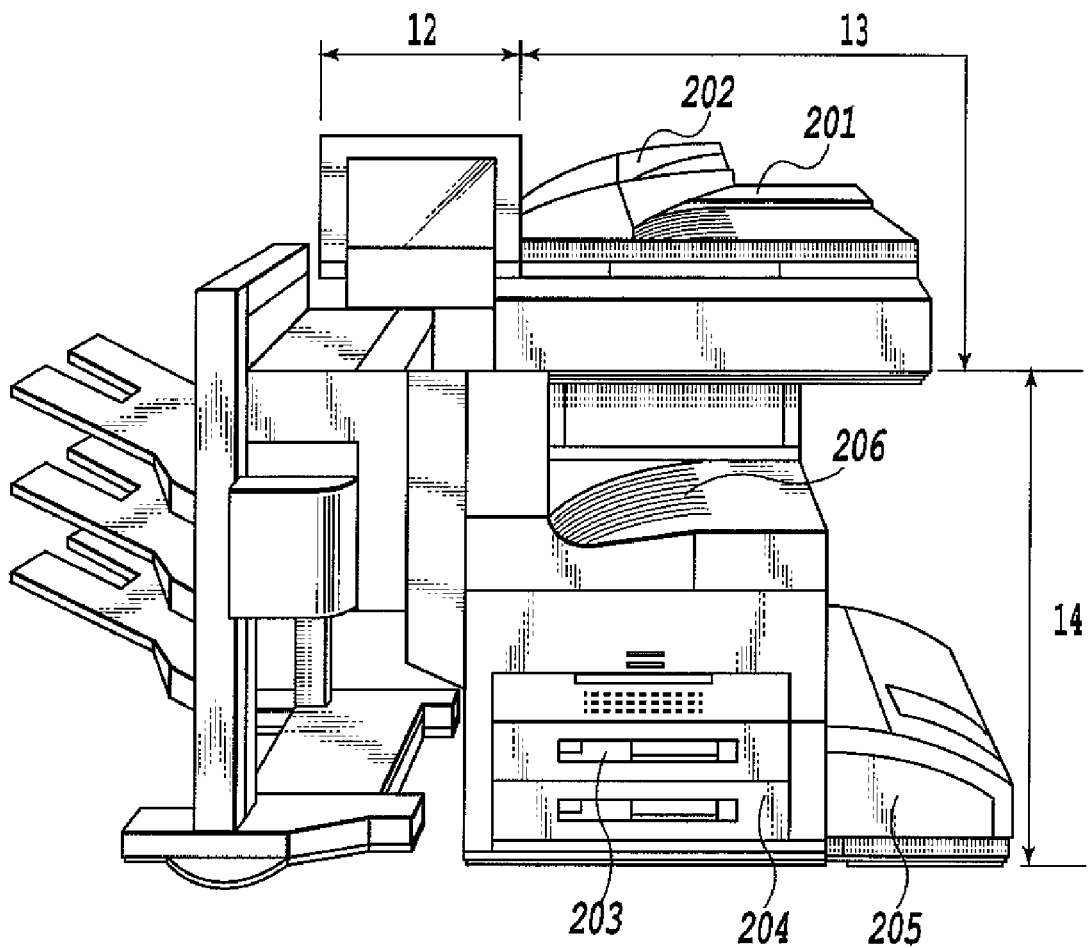
FIG. 2 is an external view of an I/O device of an image forming apparatus concerning the embodiment of the present invention.

FIG. 2 shows an external appearance of the image forming apparatus 10. The scanner unit 13 has a plurality of CCDs. If the sensitivity of each of the CCDs differs, each pixel will be recognized as having a different density even if the density of each pixel above a document is the same. For this reason, in the scanner unit 13, a white sheet (a uniformly white sheet) is exposed and scanned first, and then the quantity of reflected light acquired by exposing and scanning is converted into an electric signal and output to the controller unit 11.

In addition, as described below, a shading correction section 500 inside the controller unit 11 recognizes a difference in the sensitivity of each CCD on the basis of the electric signal acquired from each CCD. Then, by utilizing a difference in this recognized sensitivity, the shading correction section 500 corrects the value of an electric signal acquired by scanning an image on a document. Furthermore, upon receipt of the information on gain adjustment from the later-described CPU 301 inside the controller unit 11, the shading correction section 500 performs gain adjustment corresponding to this information. The gain adjustment is used to adjust how the value of an electric signal acquired by exposing and scanning a document is allocated to the luminance signal values of 0 to 255. This gain adjustment can convert the value of an electric signal acquired by exposing and scanning the document, into a high luminance signal value or into a low luminance signal value. Next, the configuration for scanning an image on this document is described.

The scanner unit 13 exposes and scans an image on the document and inputs the acquired reflected light to the CCDs, and thus converts image information into an electric signal. The scanner unit 13 further converts the electric signal into a luminance signal composed of each of the R, G, and B colors and outputs this luminance signal as image data to the controller unit 11. That is, the scanner unit 13 is an image reader for reading an image formed on a recording medium.

The document is placed on a tray 202 of a document feeder 201. When a user enters a reading start instruction through the operating portion 12, the controller unit 11 gives a document read instruction to the scanner unit 13. Upon receiving this instruction, the scanner unit 13 separately feeds the sheets of document on the tray 202 of the document feeder 201, and performs the reading of the document. To read a document, instead of using the automatic feeding performed by the document feeder 201, individual pages of the document may be positioned on a glass panel (not shown) and scanned by moving an exposure unit.

The printer unit 14 is an image forming device that prints image data received from the controller unit 11 onto a recording medium, i.e., forms an image. In this embodiment, an image forming system is an electrophotographic system using a photosensitive drum or a photosensitive belt. However, the present invention is not limited thereto and can be also applied, for example, for an inkjet system that ejects ink through fine nozzle arrays to print an image on a sheet. Moreover, the printer unit 14 is provided with a plurality of sheet cassettes 203, 204, and 205 that permit a user to select different sheet sizes or different sheet feed directions. Printed sheets are discharged to a delivery tray 206.

<Detailed Description of the Controller Unit 11>

Figure 3:
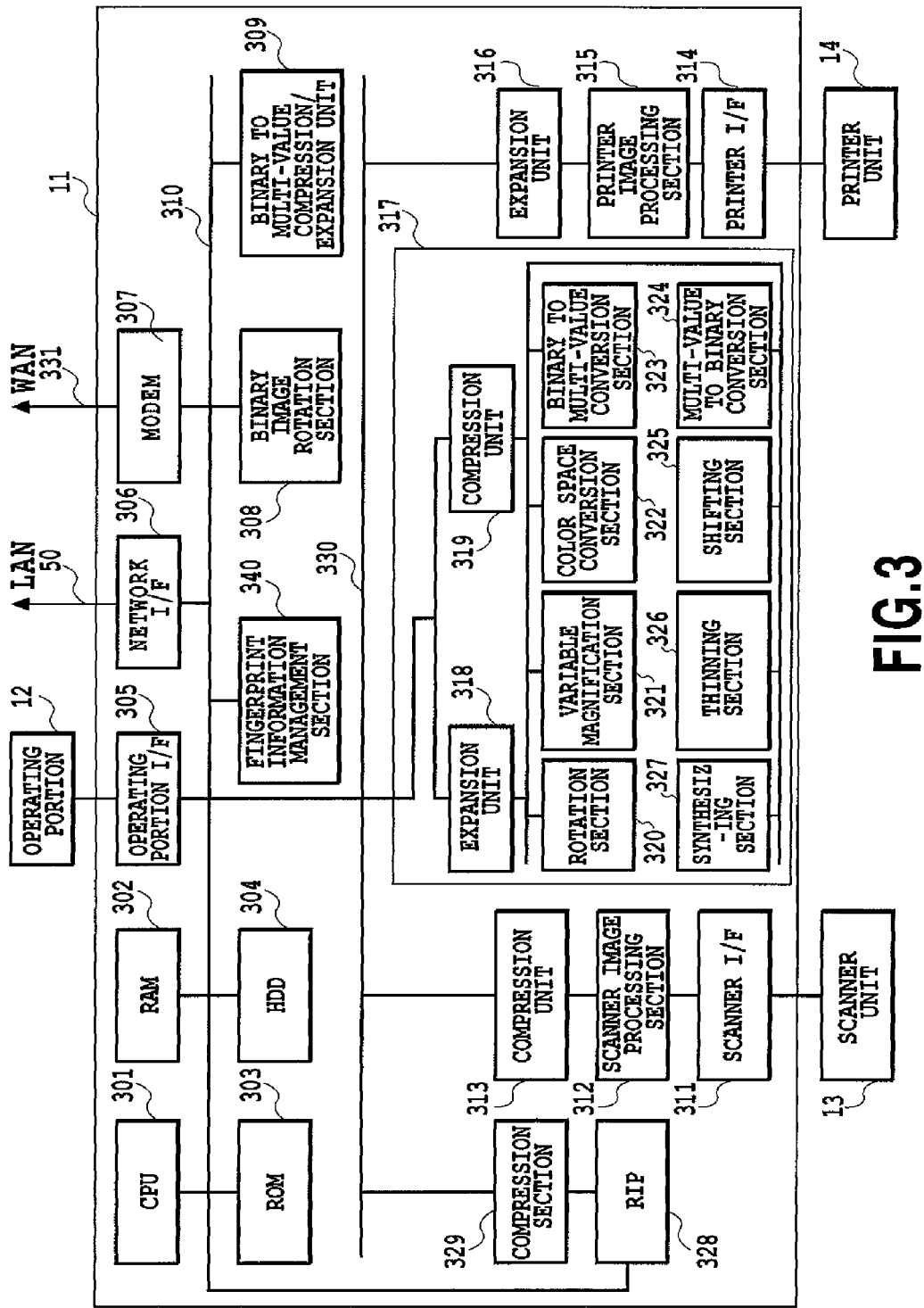
FIG. 3 is a block diagram for illustrating a configuration of a controller unit of the image forming apparatus concerning the embodiment of the present invention in more detail.

FIG. 3 is a block diagram for illustrating in more detail the configuration of the controller unit 11 of the image forming apparatus 10.

The controller unit 11 is electrically connected to the scanner unit 13 and the printer unit 14, and is also connected to the PC 40, an external apparatus, or the like via the LAN 50 and a WAN 331. With this arrangement, image data, device information, and collation information can be input and output.

A CPU 301 employs a control program stored in a ROM 303 to collectively control the access of the various devices that are currently connected, and also to collectively control the various processes that are performed inside the controller unit. A RAM 302 is a system work memory used by the CPU 301 and also as a memory for temporarily storing image data. The RAM 302 is constituted by an SRAM, the contents of which are retained after the power is switched off, and a DRAM, the contents of which are erased after the power is switched off. A boot program and the like for the apparatus are stored in the ROM 303. In this embodiment, the CPU 301 performs processing operations, such as various kinds of calculations, controls, and determination, in accordance with the control programs for processings and the like concerning this embodiment, the control programs being stored in the ROM 303. An HDD 304, i.e., a hard disk drive, is used to store system software and image data.

An operating portion I/F 305 is an interface unit for connecting a system bus 310 to the operating portion 12. This operating portion I/F 305 receives, via the system bus 310, image data to be displayed on the operating portion 12 and outputs the image data to the operating portion 12, and also transmits to the system bus 310 information received from the operating portion 12.

A network I/F 306 is connected to the LAN 50 and the system bus 310 for the input and output of information. A modem 307 is connected to the WAN 331 and the system bus 310 for the input and output of information. A binary image rotation section 308 converts the direction of the image data to be transmitted. A binary image compression/expansion unit 309 converts the resolution of image data to be transmitted into a predetermined resolution or a resolution that is consonant with the capability of a destination apparatus. In addition, for data compression or expansion, a JBIG, MMR, MR, or MH system, or the like is employed. An image bus 330, which is used as a transfer path for the exchange of image data, is either a PCI bus or formed in accordance with IEEE 1394 provisions.

A scanner image processing section 312 performs corrections, or works with or edits image data received from the scanner unit 13 via a scanner I/F 311. In addition, the scanner image processing section 312 determines whether the received image data is for a color document or for a black and white document, or for a character document or a photograph document, and attaches the determination result to the image data. This associated information is called attribute data. The detail of the process performed by the scanner image processing section 312 will be described below.

Figure 4:
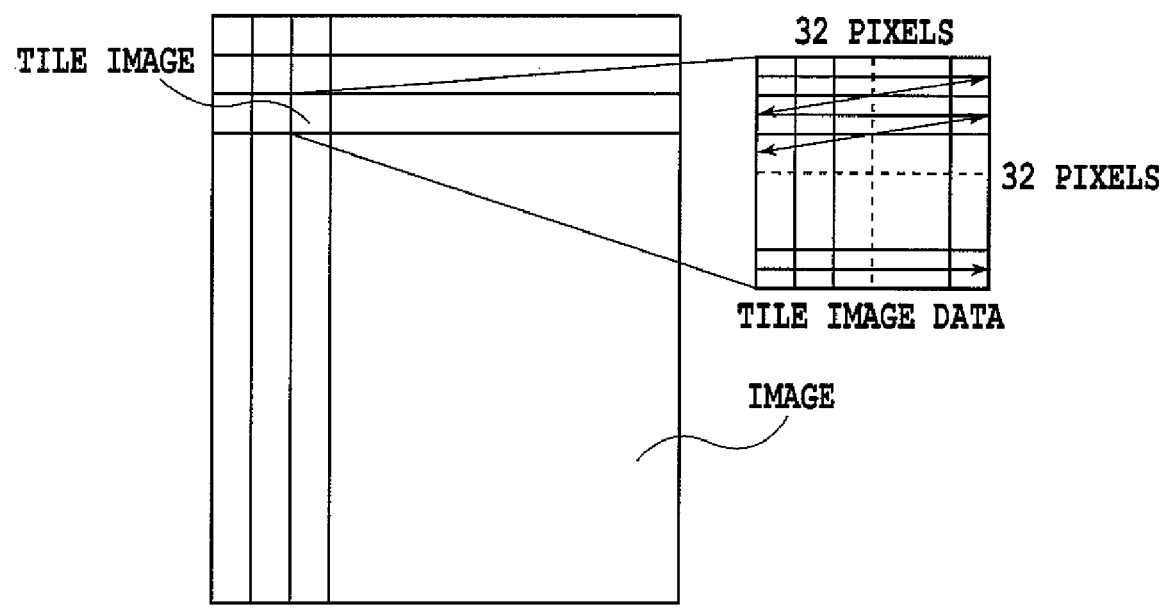
FIG. 4 is a view conceptually showing tile image data concerning the embodiment of the present invention.

A compression section 313 receives the image data and divides this image data into blocks of 32 pixels×32 pixels each. In addition, the 32×32 pixel image data is called tile data. FIG. 4 is a conceptual diagram showing this tile data. In a document (a sheet medium before scanning), an area corresponding to tile data is called a tile image. For tile data, average luminance information for a block of 32×32 pixels and the coordinate position on a document of the tile image are additionally provided as header information. The compression section 313 further compresses the image data consisting of multiple sets of tile data. An expansion unit 316 expands image data consisting of multiple sets of tile data, performs raster development for the data, and then transmits the resultant data to a printer image processing section 315.

The printer image processing section 315 receives the image data from the expansion unit 316, and performs image processing for the image data with reference to attribute data added to the image data. The image data acquired through the image processing is then output to the printer unit 14 via a printer I/F 314. The details of the processing performed by this printer image processing section 315 will be described below.

An image conversion section 317, which performs a predetermined conversion for the image data, includes the following processors.

An expansion unit 318 expands received image data. A compression section 319 compresses the received image data. A rotation section 320 rotates the received image data. A variable magnification section 321 performs a resolution conversion process (e.g., from 600 dpi to 200 dpi) for received image data. A color space converting section 322 changes the color space for received image data. With the use of a matrix or a table, the color space converting section 322 can perform a well-known background color removal process, a well-known LOG conversion process (RGB to CMY), and a well-known output color correction process (CMY to CMYK). A binary/multi-value converting section 323 converts received binary tone image data into 256 tone image data, while a multi-value to binary converting section 324 converts received 256 tone image data into binary tone image data using a method, such as an error diffusion process.

A synthesis unit 327 synthesizes two sets of received image data to generate one set of image data. For the synthesis of two sets of image data, there is a method whereby the average value for the luminance levels of pixels to be synthesized is regarded as a synthesis luminance value, or a method whereby a greater luminance value of a pixel to be synthesized is regarded as the luminance level of the resultant pixel after synthesis. Moreover, there is also a method whereby a smaller luminance level of a pixel to be synthesized is regarded as the luminance level after synthesis, or a method whereby the luminance level employed after synthesis is determined through the logical sum calculation, the logical product calculation or the exclusive OR calculation of pixels to be synthesized. These synthesis methods are all well known. A thinning section 326 then performs a resolution conversion by thinning out the pixels of received image data, and generates image data for which the count is ½, ¼, or ⅛ that which is received. Thereafter, a shifting section 325 adds a margin portion to, or deletes a margin portion from, the received image data.

An RIP 328 receives intermediate data, which is generated based on PDL code data transmitted from the PC 40 or the like, and generates (multi-valued) bit map data.

The paper fingerprint information management section 340 associates the paper fingerprint information acquired by the processing of the scanner image processing section 312 with a plurality of pages to be collated for management.

<Detailed Description of the Scanner Image Processing Section 312>

Figure 5:
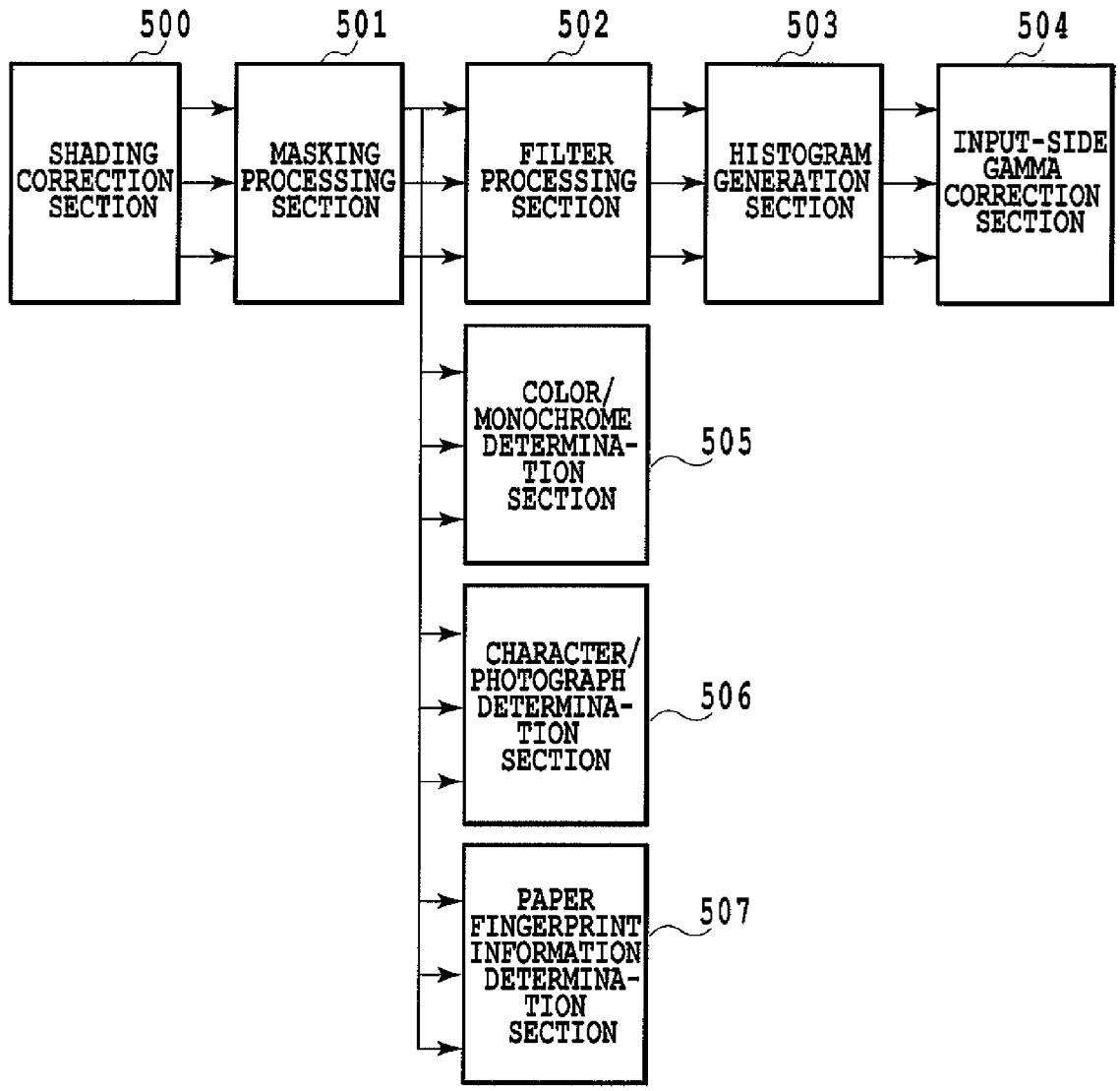
FIG. 5 is a block diagram of a scanner image processing section concerning the embodiment of the present invention.

FIG. 5 shows the internal configuration of the scanner image processing section 312.

The scanner image processing section 312 receives image data consisting of RGB luminance signals of 8 bits each. The shading correction section 500 performs a shading correction for these luminance signals. The shading correction is a process for preventing the brightness of a document from being mis-recognized due to a variation of the sensitivity in CCD, as described above. As described above, the shading correction section 500 can also perform gain adjustment in accordance with an instruction from the CPU 301.

Subsequently, these luminance signals are converted by a masking processing section 501 into standard luminance signals that do not depend on the filter color of the CCD.

A filter processing section 502 arbitrarily corrects the spatial frequency of received image data. The filter processing section 502 performs a computation for the received image data using a matrix of 7×7. In addition, in a copying machine or a multifunctional apparatus, a user can select a character mode, a photograph mode, or a character/photograph mode as a copy mode by pressing a tab 714 in FIG. 7, for example. When the character mode is selected by the user, the filter processing section 502 applies character filtering to the entire image data. Moreover, when the photograph mode is selected, the filter processing section 502 applies photograph filtering to the entire image data. Moreover, when the character/photograph mode is selected, the filter processing section 502 adaptively changes a filter for each pixel in response to a below-described character/photograph determination signal (a part of the attribute data), i.e., it is determined whether photograph filtering or character filtering should be applied for each pixel.

Note that a coefficient for performing smoothing only for a high frequency element is designated for a photograph filter. This is done to prevent the roughness of an image from being outstanding. Further, a coefficient to perform edge enhancement is set for a character filter. This is done to better express sharpness of a character.

A histogram generating section 503 samples the luminance data of the individual pixels constituting received image data. More specifically, the histogram generating section 503 samples, at constant pitches in the main scanning direction and the sub-scanning direction, the luminance data included in a rectangular area that is defined from a starting point to an ending point designated in the main scanning direction and the sub-scanning direction. Then, the histogram generating section 503 generates histogram data based on the sampling results. The generated histogram data is used when the level of a background color is estimated during the background color removal process. An input-side gamma correction section 504 converts the generated histogram data into a luminance data having a nonlinear characteristic by using a table or the like.

A color/monochrome determination section 505 determines whether each pixel constituting received image data represents chromatic color or achromatic color, and attaches the determination result, as a color/monochrome determination signal (a part of the attribute data), to the image data.

A character/photograph determination section 506 determines whether or not the pixel is a constituent of a character, or of a halftone dot, or of a character in a halftone dot, or of a solid image, based on the pixel value of each pixel constituting image data and the pixel values of surrounding pixels of the pertinent pixel. Note that a pixel that does not fit into any of these categories is a pixel constituting a blank area. Then, the character/photograph determination section 506 attaches the determination results, as a character/photograph determination signal (a part of the attribute data), to the image data.

A paper fingerprint information acquisition section 507 acquires, from the mask processing section 501, image data of a predetermined area (at least one or more areas) among the RGB image data that is input from the shading correction section 500 to the mask processing section 501. Hereinafter, the paper fingerprint information acquisition process performed by the paper fingerprint information acquisition section 507 is described in detail in FIG. 8.

<Detailed Description of the Paper Fingerprint Information Acquisition Section 507>

Figure 8:
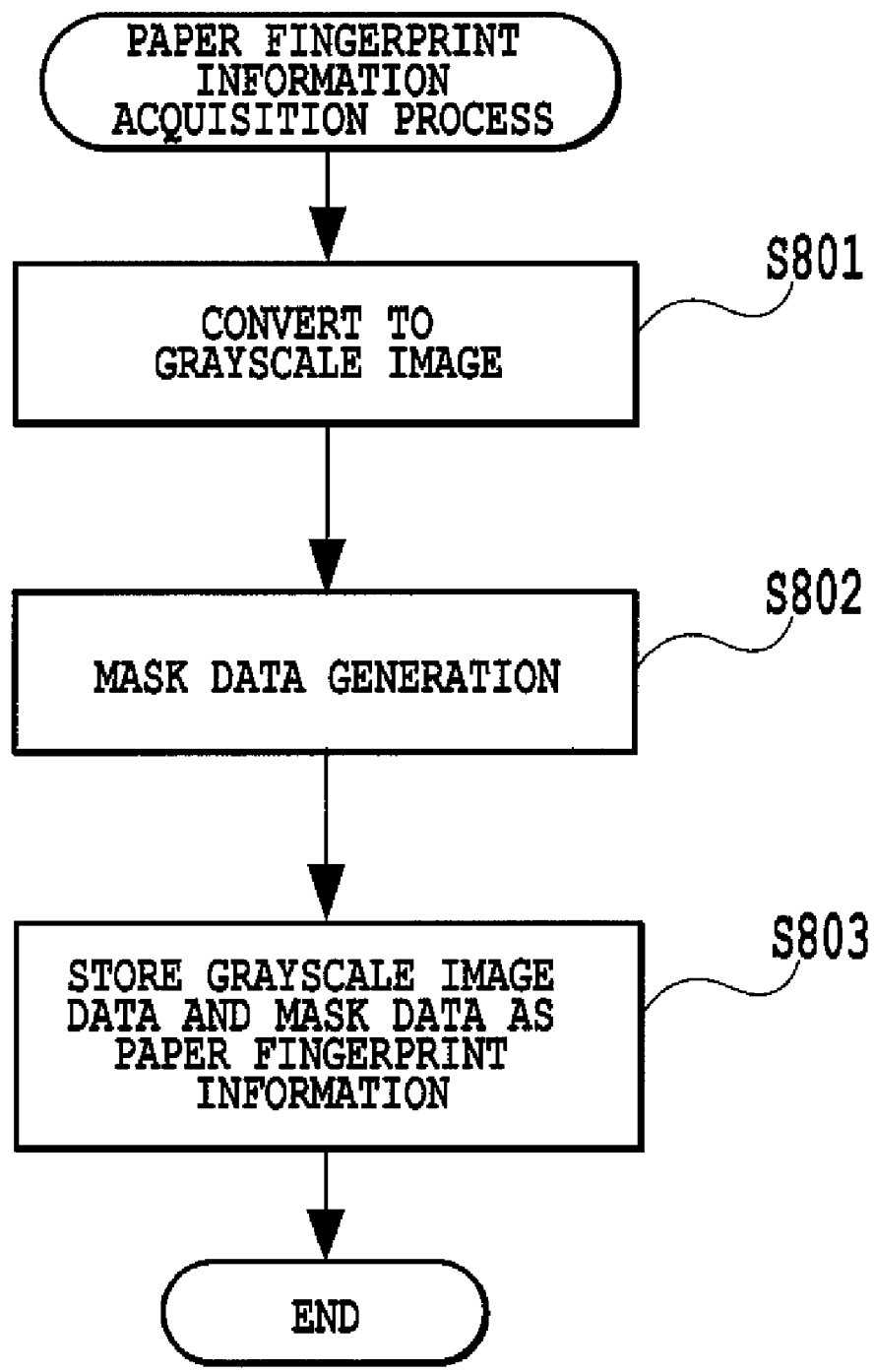
FIG. 8 is a flowchart of a paper fingerprint information acquisition process concerning the embodiment of the present invention.

FIG. 8 is a flowchart showing the paper fingerprint information acquisition process performed by the paper fingerprint information acquisition section 507 of FIG. 5. The paper fingerprint information acquisition section 507 is controlled by the CPU 301 of the controller unit 11 as described above.

In S801, the paper fingerprint information acquisition section 507 converts the above-described acquired image data into a grayscale image data.

In S802, on the basis of this grayscale image data, the paper fingerprint information acquisition section 507 removes the data, such as a printed or handwritten character, possibly causing incorrect determination, to prepare a mask data for collation. Here, the mask data expresses a binary data of "0" or "1."

The paper fingerprint information acquisition section 507 sets the value of the mask data to "1" for a pixel whose luminance signal value is equal to or greater than a first threshold value in this grayscale image data (i.e., the pixel is bright). On the other hand, the paper fingerprint information acquisition section 507 sets the value of the mask data to "0" for a pixel whose luminance signal value is less than the first threshold value (i.e., the pixel is dark).

The paper fingerprint information acquisition section 507 performs the above-described processes to each pixel included in the grayscale image data.

In S803, the paper fingerprint information acquisition section 507 acquires two pieces of data, i.e., the relevant grayscale image data and the relevant mask data, as the paper fingerprint information.

Note that the image data itself converted into a grayscale data in S801 is sometimes referred to as paper fingerprint information, however, in this embodiment the above-described two pieces of data will be referred to as paper fingerprint information.

The paper fingerprint information acquisition section 507 sends the paper fingerprint information of the above-described paper fingerprint information acquisition area to the RAM 302 via a non-illustrated data bus.

<Detailed Description of the Printer Image Processing Section 315>

Next, a process flow in the printer image processing section 315 in FIG. 3 is described with reference to FIG. 6.

A background color removal processing section 601 removes the background color of image data by using a histogram generated in the scanner image processing section 312.

A monochrome generating section 602 converts color data into monochrome data.

A Log converting section 603 performs luminance and density conversion, e.g., converts input RGB image data into CMY image data.

An output color correction section 604 performs output color correction, e.g., converts input CMY image data into CMYK image data by using a table or a matrix.

An output-side gamma correction section 605 performs corrections so that a signal value input to the output-side gamma correction section 605 is proportional to a reflection density value after the duplicate is output.

A half tone correction section 606 performs a half tone process in consonance with the number of tones to be output by the printer unit 14, e.g., performs binarization or a quantization to 32-value processing for the received image data of high gradation values.

Note that the individual processors provided for the scanner image processing section 312 and the printer image processing section 315 can also output the received image data without performing any process. An event wherein a specific processor passes data without performing any process in this way is referred to as "permitting data to pass through a processing section."

<Description of an Operation Screen>

Next, a copy standard screen on an operation panel according to this embodiment is described with reference to FIG. 7. In addition, the image forming apparatus 10 of this embodiment is set to start with the copy standard screen by default display when power is supplied.

A message line 701 indicates the statuses of copy jobs in various messages.

A magnification indicator 702 indicates magnification, in percent, that is set by a user or is automatically determined by a copy mode.

A paper-size indicator 703 indicates the selected size of output paper, and indicates a message "auto paper selection" when the auto paper selection is set.

A numerical indicator 704 indicates the required number of copies.

A reduction key 705 is used for making a reduced copy.

A same-size key 706 is used for returning the setting from reduction or enlargement to same-size.

An enlarge key 707 is used for making an enlarge copy.

A zoom key 708 is used to finely set the magnification for making a reduced copy or an enlarge copy.

A paper-selection key 709 is used for designating a type of output paper.

A sorter key 710 is used for setting a sort mode or a staple mode.

A double-side key 711 is used for setting the double-side copying mode.

A density indicator 712 indicates the currently set density of copy. Darker copies are indicated toward the right side and lighter copies are indicated toward the left side. The density indicator 712 also changes the indication in cooperation with a lighter key 713 and a darker key 715.

The lighter key 713 is used for making a lighter copy.

An auto key 714 is used for a mode of automatically determining density of copy.

The darker key 715 is used for making a darker copy.

A character key 716 is used for setting the "character mode", which automatically sets the density suitable for copying characters documents.

A character/photograph key 717 is used for setting the "character/photograph mode", which automatically sets the density suitable for copying documents containing characters and photographs.

An application mode key 718 is used for setting various copy modes that cannot be set on the copy standard screen.

A print status key 719 is used for checking the status of the printing operation currently performed. The print status key 719 is indicated not only on the copy standard screen, but also always appears at this position. Accordingly, the print status can be checked any time by pressing this key.

A paper fingerprint information registration tab 720 is a tab for selecting a paper fingerprint information registration process used for collation. This paper fingerprint information registration process will be described below.

A paper fingerprint information collation tab 721 is a tab for selecting the paper fingerprint information collating process. This paper fingerprint information collating process will be also described below.

A button 722 is used for instructing to generate code information, which will be described in detail later.

A button 723 is used for instructing to print the code information, which will be described in detail later.

A button 724 is used for instructing to decode the code information, which will be described in detail later.

Figure 7:
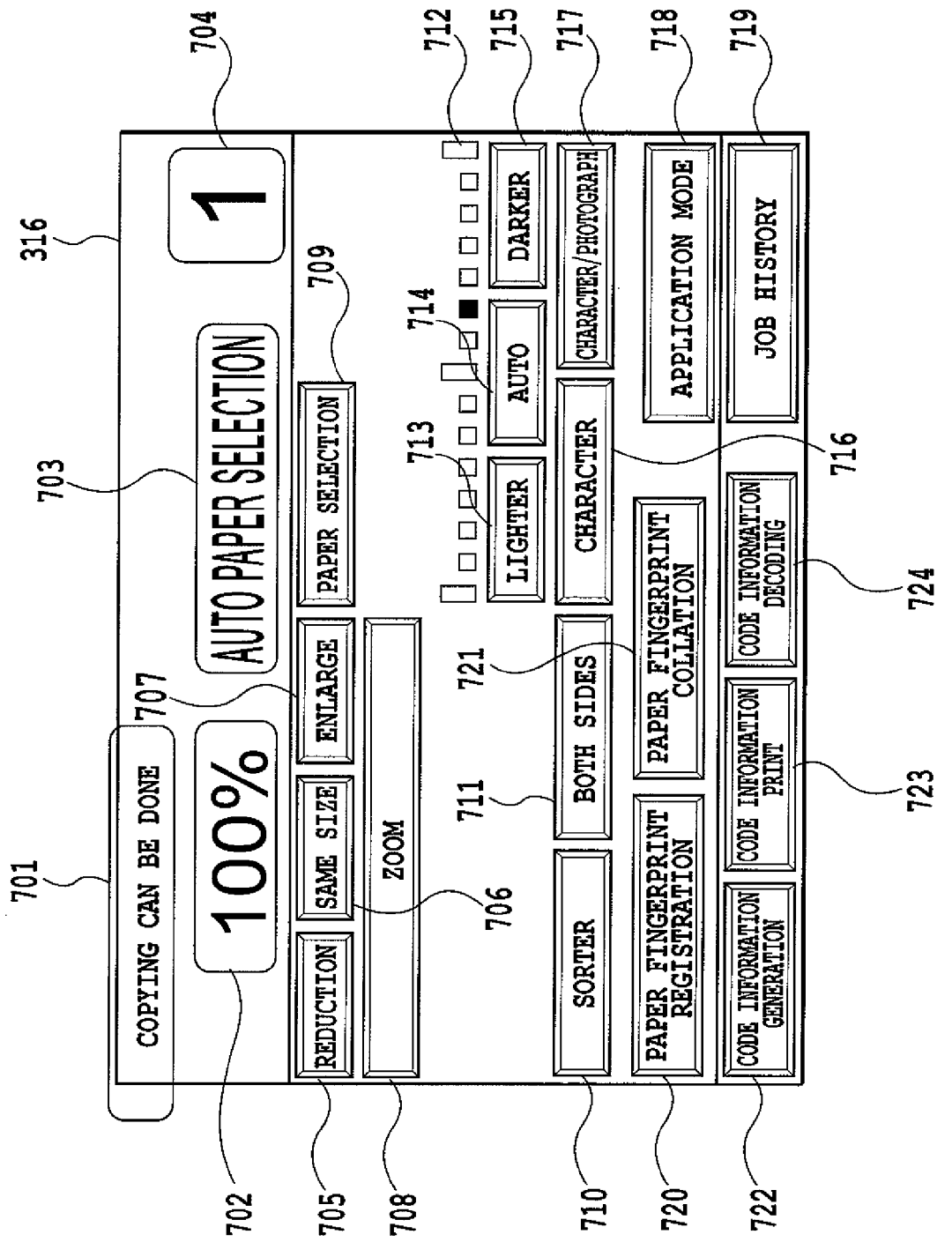
FIG. 7 is an explanatory view of a copy standard screen of an operating portion concerning the embodiment of the present invention.

When a start key (not shown) is pressed, each process in the image forming apparatus 10 will be performed based on the print setting set by means of various kinds of keys in FIG. 7.

<Code Data Generating Process>

Figure 9:
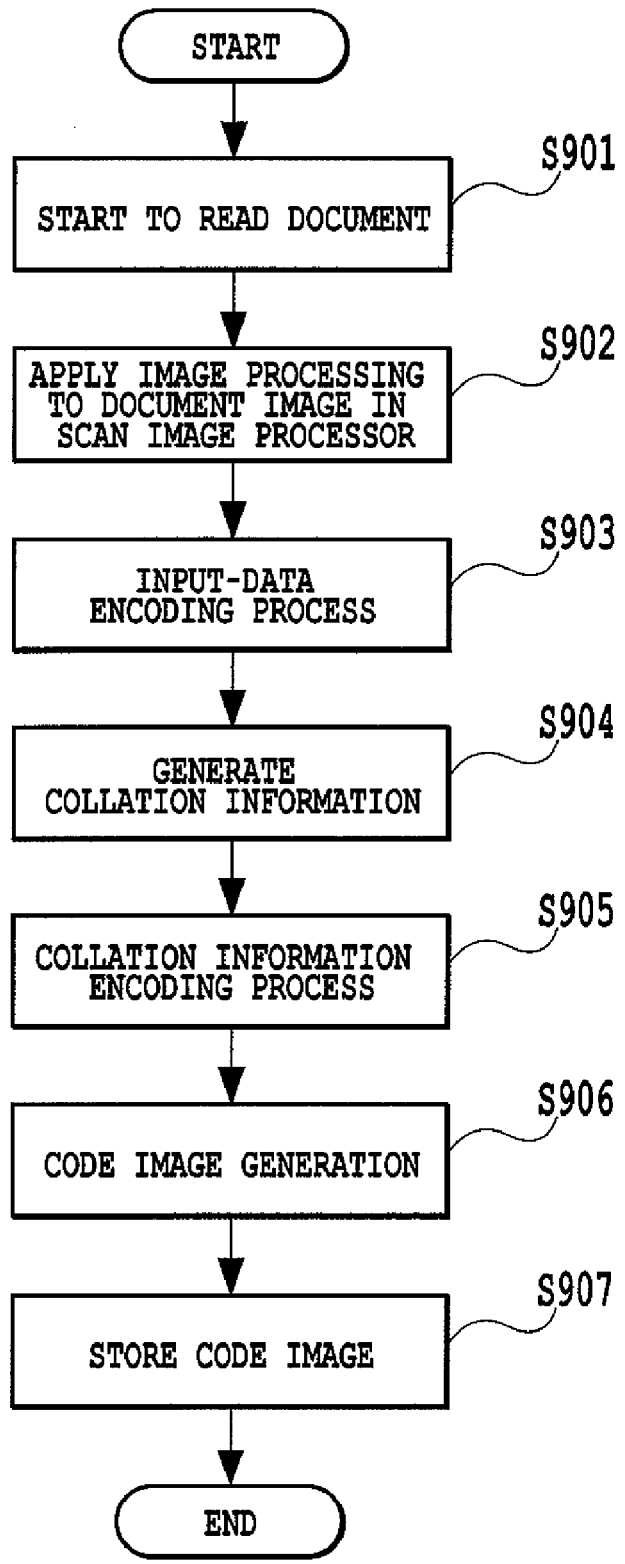
FIG. 9 is a flowchart of a code image generation process concerning the embodiment of the present invention.

Next, a process performed in converting the data read by the scanner unit 13 into encoded data (also, referred to as code data) is described using a flowchart of FIG. 9. Each step of the flowchart shown in FIG. 9 is collectively controlled by the CPU 301.

First, when a user operates an operation panel of FIG. 7 and presses the button 722 for instructing to generate code information, the CPU 301 shown in FIG. 3 starts the process of S901 and will perform the various operations until the image read by the scanner unit 13 is converted into code image.

First, in S901, the CPU 301 performs an operation of reading an image serving as a document by means of the scanner unit 13. In this way, the image data serving as a document is input to the image forming apparatus 901.

Figure 6:
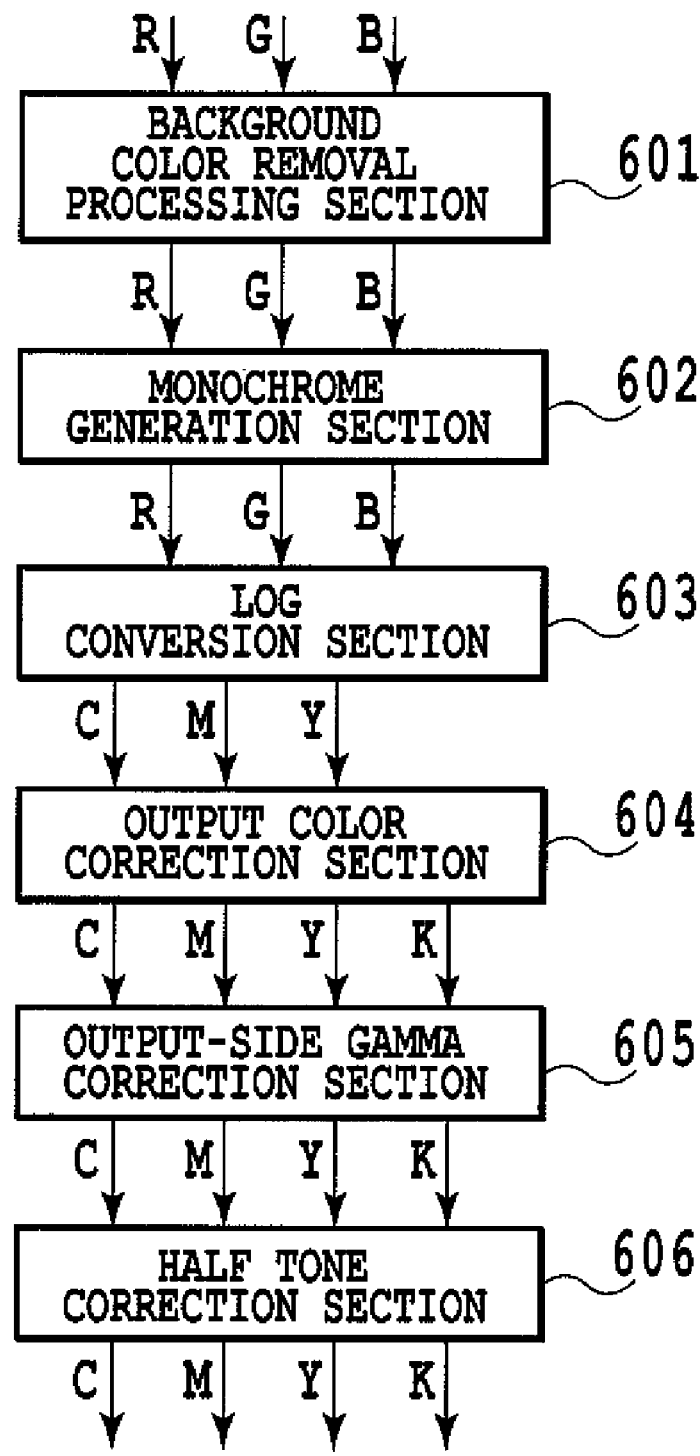
FIG. 6 is a block diagram of a printer image processing section concerning the embodiment of the present invention.

Next, in S902, the CPU 301 performs the image processing shown in FIG. 6 on the image read in S901, and thereafter temporarily stores this image-processed image data into the RAM 302 as digital data. That is, the CPU 301 generates digital data based on the image data read by the scanner unit 13.

In the process of S903, the CPU 301 compresses (encodes) the digital data stored in the RAM 302 to generate first encoded data, such as a one-dimensional bar code, a two-dimensional bar code, or an digital watermark. By outputting the first encoded data by means of the printer unit 14, a first code image is output. For the compression system, various kinds of systems, such as MMR, JBIG, and JPEG can be used. In this way, the image forming apparatus 10 creates the first code image, which is code image data stored in the image forming apparatus 10 that includes an image processing apparatus.

Next, the CPU 301 performs the process of S904 to generate collation information.

The collation information is to be coupled to the first encoded data, i.e., the encoded read image, and is information with which an internal controller unit of a digital copying machine, a multifunctional apparatus, a computer, or the like, can interpret the process for the first encoded data.

In this embodiment, the collation information contains three types of information. A first one is first information on a unique number (serial number or the like) for identifying a printed paper. A second one is second information indicative of a location storing the paper fingerprint information of the printed paper (the paper fingerprint is fiber pattern of a paper in certain region on the paper, and is the information inherent to a recording medium). Namely, the second information is information indicative of the location of a storage unit storing the collation paper fingerprint information described below (the location for storing the collation paper fingerprint information).

Then, a third one is third information instructing to collate a paper-pattern (paper fingerprint information) extracted by the scanner unit 13, the paper-pattern being extracted from a recording medium in which the first code image is formed, with a paper-pattern acquired for collation with the extracted paper-pattern. That is, the third information is the one for instructing to collate based on the paper fingerprint information which is the information inherent to the recording medium.

In this embodiment, the third information is the information that collates, when decoding the first encoded data into original digital data, first paper-pattern information (first paper fingerprint information) with second paper-pattern information (second paper fingerprint information), and allows decoding the first encoded data into the original data if this collation result indicates coincidence. That is, the third information is the one that indicates whether the above-described decoding process is unconditionally performed (automatically performed) or performed only if a condition is met (the collation process is performed, and then the decoding is performed only if the collation result indicates coincidence). The first paper-pattern information is the one (collation paper fingerprint information described below) on the paper-pattern of a paper in which the first encoded data is printed. The second paper-pattern information is paper-pattern information (paper fingerprint information to be collated described below) stored in a storage unit, such as the paper-pattern information registered in a server described below.

In this embodiment, as described below, since the process on the decoding is determined based on the third information, the third information is information on the process of restoring electronic data from the first encoded data.

According to this embodiment, as defined by the second information, a location to store the paper fingerprint information is a server (not shown). However, the above-described storing location is not limited to a server, but may be a storage unit (e.g., HDD 304) in the image forming apparatus 10, or may be a storage unit externally attached to the image forming apparatus 10. That is, the storing location may be any means as long as it is a storage means capable of storing information.

Moreover, in S904, a dialog may be displayed on a displaying section included in the image forming apparatus 10, to allow a user to select the storing location. In this way, the image forming apparatus 10 can acquire the information designating the storing location, and can generate the second information based on this acquired information. Needless to say, the storing location may be set in advance prior to the code data generation process.

Furthermore, in S904, a dialog may be displayed on the displaying section included in the image forming apparatus 10, so as to allow a user to select the contents indicated in the third information, or to select whether the decoding process is unconditionally performed or performed only if a condition is met. In this way, the image forming apparatus 10 can determine the contents of an indication contained in the third information. Needless to say, the above-described contents of indication may be set in advance prior to the code data generation process.

Note that, in this embodiment, "the paper-pattern acquired for collation with the extracted paper-pattern" is a paper fingerprint serving as a comparison object of the paper fingerprint extracted from the read recording medium. The comparison object is used for determining whether or not the read recording medium is a recording medium whose security is to be enhanced. Accordingly, the image forming apparatus 10 has only to hold this paper-pattern during the above-described collation, and the acquisition method therefor may be any method. Although in this embodiment this paper-pattern is acquired from a server as described below, this paper-pattern may be acquired from data that is buried along with the first encoded data into the read recording medium, as with a third embodiment.

Next, in S905, the CPU 301 compresses (encodes) the collation information in advance, which is generated in the process of S904, in accordance with a predetermined compression format, and in the process of S906 the CPU 301 generates the second encoded data for printing this compressed data onto a recording medium, such as a paper. By outputting this second encoded data by means of the printer unit 14, the second code image is output. As the second code image, various ones, such as a one-dimensional bar code, a two-dimensional bar code, or a digital watermark may be used.

In the final process of S907, the CPU 301 stores the first encoded data and the second encoded data into the HDD 304 or the like. These stored encoded data are used in the later-described process of printing code data.

Note that, in this embodiment, it is described that the data for acquiring the first encoded data is read from a recording medium, such as a paper, but not limited thereto. For example, digital-content data of various types, including image, audio, and text, transferred from an external apparatus, such as a host computer, may be also generated as the code image. That is, the image forming apparatus 10 generates the first encoded data by encoding the electronic data acquired by the image forming apparatus 10, i.e., the electronic data stored in a storage unit, such as the RAM 302, included in the image forming apparatus.

<Code Data Printing Process>

Figure 10:
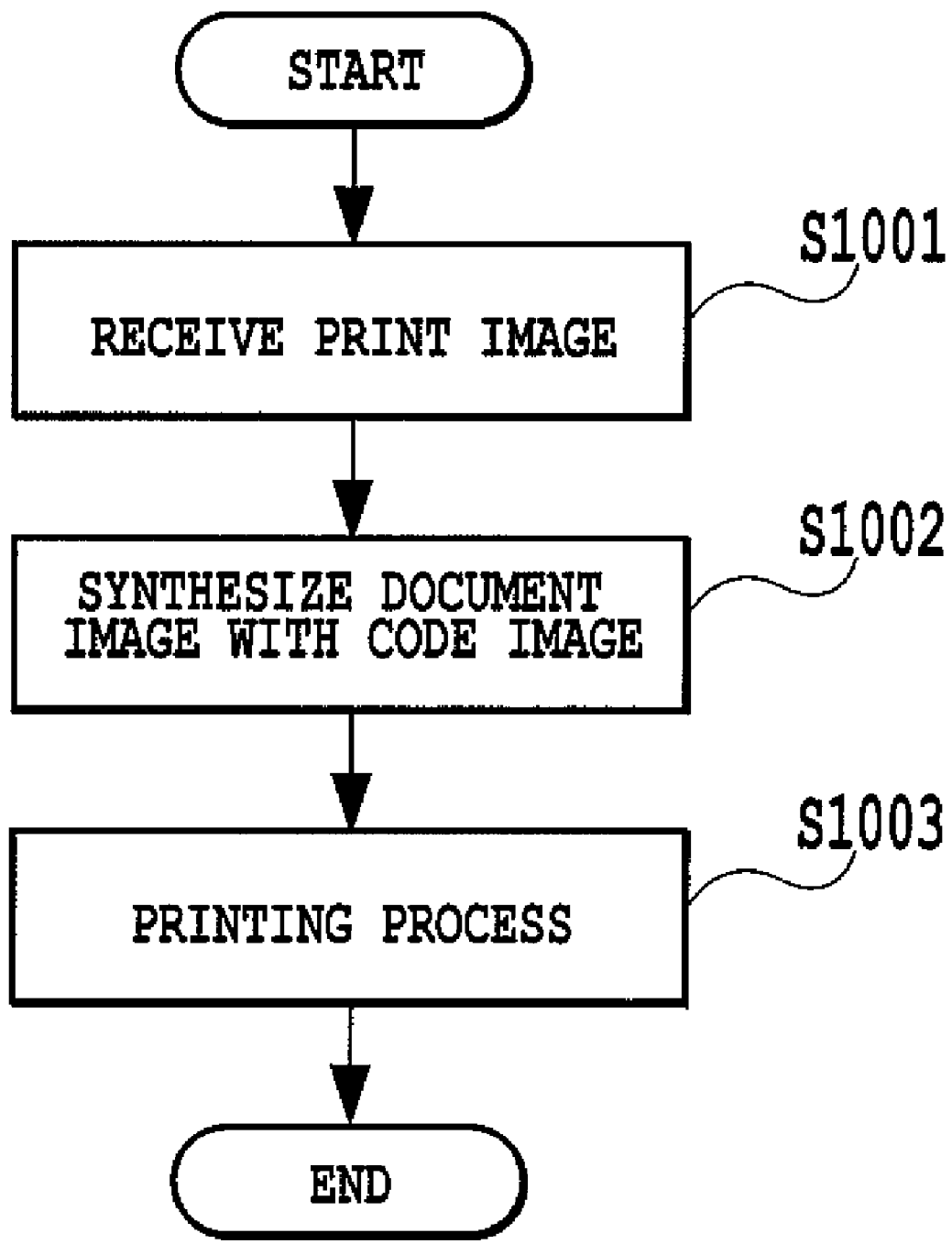
FIG. 10 is a flowchart of a code image printing process concerning the embodiment of the present invention.

Next, a process upon printing the code image in the printer unit 14 is described using a flowchart of FIG. 10. Each step of the flowchart shown in FIG. 10 is collectively controlled by the CPU 301.

First, when a user operates the operation panel of FIG. 7 and presses the button 723 for instructing to print the code image, the CPU 301 shown in FIG. 3 instructs, on the operation panel, a user to read the image which is to be printed separately from the code image. The user presses the start key so that a document which the user desires to print as image is read in. Thus, in S1001, separately from the code image, the image read through the scanner unit 13 is stored in the RAM 302. That is, in S1001, the image forming apparatus 10 acquires the image data, which the user desires to print, along with the first and second code images.

Figure 11:
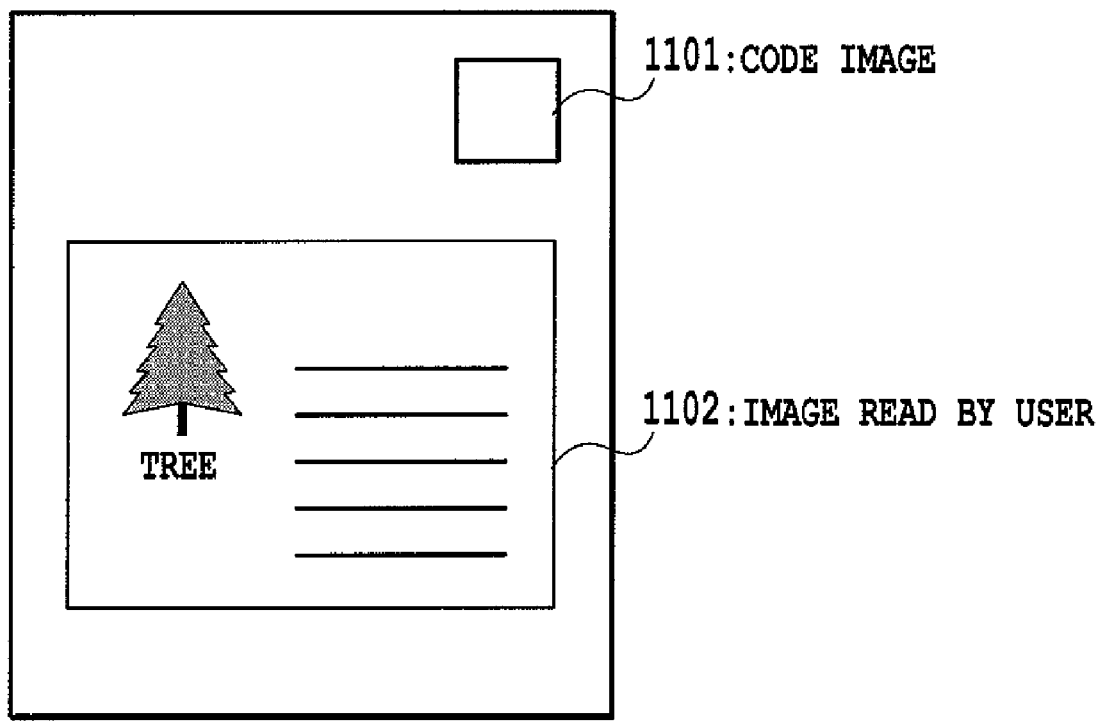
FIG. 11 is a schematic diagram of a sheet on which code image is printed concerning the embodiment of the present invention.

Next, in S1002, the image forming apparatus 10 reads the first and second encoded data, which are held in the HDD 304 stored in S907, and performs a synthesizing process for the image data read and stored in the RAM 302 in S1001. As described above, the synthesis unit 327 is used in this synthesizing process. The synthesized image data is stored in the RAM 302 once and thereafter is transferred to the printer unit 14, and is printed on a recording medium, such as a paper, thereby forming a synthesized image. FIG. 11 shows a synthesized image printed on a paper.

In FIG. 11, reference numeral 1101 represents the first and second code images generated in accordance with the flowchart of FIG. 9, and reference numeral 1102 represents the image, which a user instructed the scanner unit 13 to read a document and synthesize the first and second code images.

In addition, in this embodiment, as the image synthesized with the code image, a document designated by a user and read by the scanner has been described, but not limited thereto. For example, the above-described synthesizing may be performed on electronic data transferred from an external apparatus, such as a host computer.

<Paper Fingerprint Information Registration Process>

Figure 12:
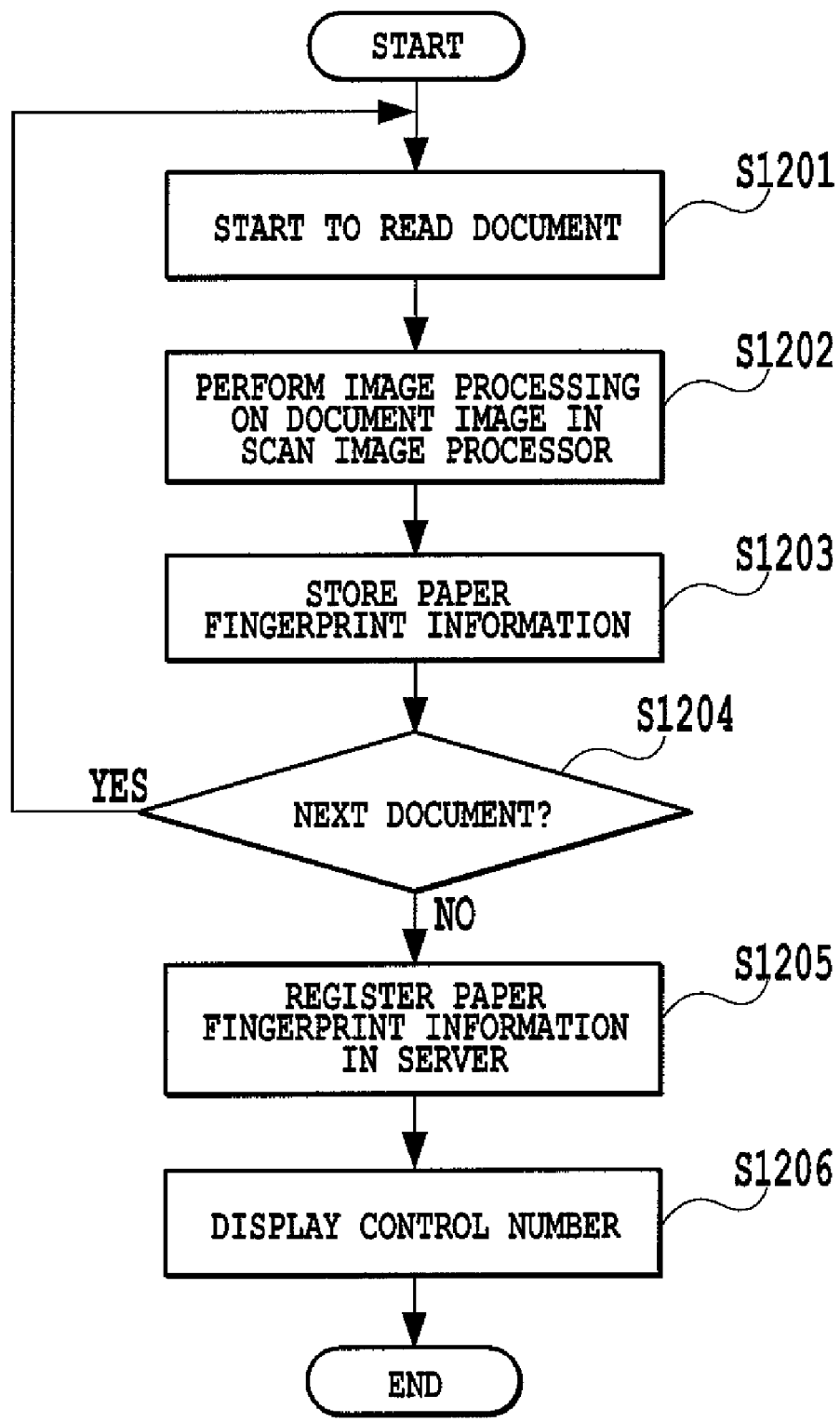
FIG. 12 is a flowchart of a paper fingerprint information registration process concerning the embodiment of the present invention.

Next, a process to register the paper-pattern of a paper in which a code image is printed is described using FIG. 12.

This embodiment is described assuming that in order to make registration only once for a printed paper, the registration operation of paper fingerprint information is allowed only once for a unique number for identifying the paper, in which the first information is printed among the information contained in the collation information described in the code data generation process. Moreover, other than this method, there are various kinds of methods, e.g., a method of specifying a time after printing a code image till the registration is performed.

The CPU 301 can read the paper fingerprint information in a predetermined area, which is sent from the paper fingerprint information acquisition section 507 to the RAM 302, and can register this read paper fingerprint information in a non-illustrated server. This registration is performed by executing a program stored in the ROM 302.

Next, a registration method of the paper-pattern information is described using a flowchart of FIG. 12. Each step of the flowchart shown in FIG. 12 is collectively controlled by the CPU 301. After the image printing of FIG. 11, first, a guidance prompting an operator to register the paper fingerprint information is displayed in the message line 701. Following this guidance, the operator arranges the synthesized image of FIG. 11 onto the scanner unit 13 (of course, the document feeder 201 may be used), and designates the paper fingerprint information registration tab 720.

In S1201, the CPU 301 controls so as to send the document read by the scanner unit 13 to the scanner image processing section 312, as an image data, via the scanner I/F 311.

In S1202, the scanner image processing section 312 sets a gain adjustment value smaller than the ordinary gain adjustment value for the shading correction section 500. Then, the scanner image processing section 312 outputs to the paper fingerprint information acquisition section 507 each luminance signal value acquired by applying the above-described small gain adjustment value to the image data. Subsequently, the paper fingerprint information acquisition section 507 acquires the paper fingerprint information based on this output data, and then sends the acquired paper fingerprint information to the RAM 302 via a non-illustrated data bus.

In a paper fingerprint acquisition technique, it is imperative to acquire a relatively dark image data in terms of acquiring a fiber pattern from a white area on the paper. For this reason, in this embodiment, the scanner image processing section 312 sets a gain adjustment value smaller than the ordinary gain adjustment value, thereby acquiring a dark image data used for acquisition of the paper fingerprint information. However, the method for acquiring the dark image data is not limited to this. For example, a method of reducing the quantity of light and scanning the synthesized image of FIG. 11 or the like may be contemplated.

In S1203, the CPU 301 stores the paper fingerprint information into the HDD 304 of the image forming apparatus 10 by using the paper fingerprint information management section 340. At this time, gray scale data in the paper fingerprint information will be stored in the HDD 304 as tile-shaped data of an area including horizontally n pixels and vertically m pixels. Namely, when another paper fingerprint information is stored after paper fingerprint information is already stored in the HDD 304, the another paper fingerprint information is to be stored in a subsequent storage area of the already registered paper fingerprint information like placing tiles in order, and thus the synthesized paper fingerprint information is formed.

In S1204, the CPU 301 determines using a non-illustrated sensor whether or not a subsequent document is currently placed on the scanner unit 13, and if it is determined that the subsequent document is currently placed, the CPU 301 proceeds to S1201, while if not the CPU 301 proceeds to S1205.

In S1205, after receiving the control number issued from a server according to the second information, the CPU 301 associates this control number, the stored paper fingerprint information acquired from the paper fingerprint information management section 340, the information on the paper fingerprint information area, and the inherent information to one another and registers these in the server.

In this way, the CPU 301 stores the acquired paper fingerprint information in a location, where the paper fingerprint information is to be stored, designated by the second information.

Since the paper fingerprint information corresponding to the respective pages of the document is to be retained as tile-shaped data in the order that the pages of the document are read in S1203, the information on the paper fingerprint information area is positional information indicating that the tile data of which area corresponds to the paper fingerprint information on which page of the document.

In S1206, the CPU 301 controls so as to display the control number on the display screen. Note that the CPU 301 may control so as to print this control number in the image forming apparatus 10. Only when an operator informs a server manager of this control number, the server manager deletes the paper fingerprint corresponding to the control number. This allows for re-registration of the paper fingerprint by the operator, as a result. Of course, the displayed management information will automatically disappear after a predetermined time under the control of the CPU 301. In addition, only when the image forming apparatus of FIG. 2 determines that the registration of paper fingerprint information may not have been made properly due to a registration error, such as a communication error to a server, a read error of the synthesized image of FIG. 11 (a feeding error of the document feeder), the control number may be displayed or printed.

The paper fingerprint information management section 340 may manage the number of times that the paper fingerprint information is stored into the HDD 304 as a paper fingerprint information storing count, and when this paper fingerprint information storing count exceeds a specified threshold value, the paper fingerprint information may be register in the server. In this case, the CPU 301 determines whether or not the control number is already issued from the server. If already issued, the CPU 301 will associate the relevant control number and the paper fingerprint information with each other and register these in the server. Accordingly, even if the registration itself is divided into multiple times of registration, the paper fingerprint information through the multiple times of registration will be managed with one control number.

In this way, the CPU 301 stores the paper fingerprint information extracted in S1202 into the server which is a location for storing the collation paper fingerprint information.

<Reading of Code Information (Encoded Data)>

Figure 13:
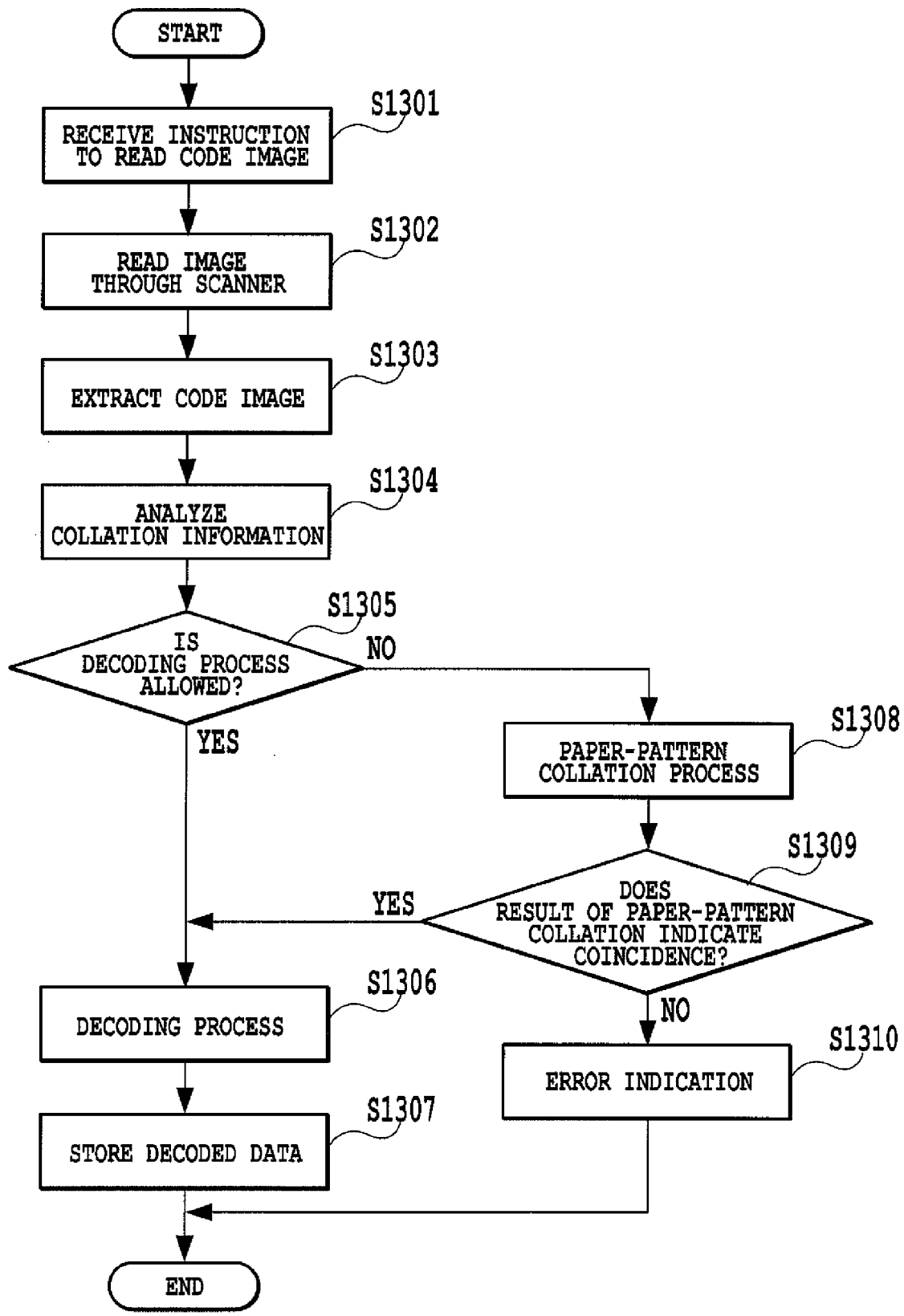
FIG. 13 is a flowchart of a process of decoding code image concerning the embodiment of the present invention.

Next, a process is described, in which the first code image is extracted from a document containing a code image read by the scanner unit 13, and is restored to digital data. First, a process to read the code image is described using the flowchart of FIG. 13. Each step of the flowchart shown in FIG. 13 is collectively controlled by the CPU 301.

First, in the process of S1301, when a user operates the operation panel of FIG. 7 and presses the button 724 instructing to decode the code information, the CPU 301 starts the process of decoding the digital data (original data) from the first code image contained in a document. That is, upon press of the button 724 by the user, the CPU 301 receives an instruction to read the first and second code images.

In the process of S1302, the CPU 301 controls the scanner unit 13 to read the document (synthesized image) as shown in FIG. 11 with the scanner, and transfers this read image data to the RAM 302 after performing the image processing of FIG.

6. That is, the image forming apparatus 10 acquires the image data containing the first and second code images.

Next, in the process of S1303, the CPU 301 extracts the first and second code images from the image data acquired in S1302, the image data being stored in the RAM 302. Since the code image contains a mark indicative of a code image, a cut-out symbol, or guide information, the CPU 301 can detect an area of the first and second code images from these information and extract the encoded information contained in the code image.

Moreover, in S1303, the CPU 301 acquires, as in S1202, the read paper fingerprint information (the paper fingerprint information to be collated described below) on the paper fingerprint in a predetermined area of the recording medium read in S1302, based on the image data acquired in S1302. The above-described predetermined area means the same location in the just read image data as the location where the registered paper fingerprint was acquired. As the method of realizing the same location in this manner, for example, in the image data from which the paper fingerprint is acquired in S1202, coordinate information on the coordinates of the area, where the paper fingerprint is acquired, may be acquired and buried into the recording medium after S1202. In this case, in S1303, the CPU 301 analyzes the buried coordinate information to acquire the read paper fingerprint information.

Moreover, in the case where the same apparatus performs the paper fingerprint information registration process and the reading process of the code information (encoded data), an area to acquire the paper fingerprint information may be set in advance in the apparatus that performs these processes. If set this way, the above-described apparatus knows the location to acquire the paper fingerprint information in advance, so, in S1303, this apparatus can acquire the paper fingerprint of the same coordinate as that of the area where the paper fingerprint is acquired in S1202.

In the process of S1304, a digital copying machine, a multifunctional apparatus, or a computer, such as PC, extracts, among the information extracted in S1303, the collation information that is added in the process of FIG. 9. That is, the CPU 301 extracts the second encoded data from the information acquired in S1303. Then, first, the CPU 301 extracts and analyzes the first information to acquire the unique number added for each code image, and extracts and analyzes the second information to identify a location where the paper fingerprint information is registered.

Next, in the process of S1305, when decoding the first encoded data, the CPU 301 analyzes the collation information and thereby determines whether or not collation with the paper-pattern of the read document, the paper-pattern being registered in the server, is needed. That is, the CPU 301 analyzes the third information, and if the CPU 301 determines that the decoding process is unconditionally allowed, i.e., that the decoding process is unconditionally performed, then the CPU 301 proceeds to S1306. On the other hand, after the analysis of the third information, if the CPU 301 determines that the decoding process is not unconditionally allowed, i.e., that the decoding process is performed only if a condition is met, and then the CPU 301 proceeds to S1308. Note that also when the third information is not attached to the image read in S1302, the CPU 301 proceeds to S1306.

In S1306, the CPU 301 decodes digital data from the first encoded data, and in S1307 stores the information decoded in S1306 or displays the same on the operating portion, and thus completes the processes.

In the process of S1305, if it is determined that the collation with the paper-pattern is needed when decoding the first encoded data, then in S1308 the CPU 301 performs the collating process of the paper-pattern based on the first information and the second information contained in the collation information. That is, based on the unique number added for each code image and the information on a location where the paper fingerprint information is registered, the both being acquired in S1304, the CPU 301 acquires the corresponding paper fingerprint information (the collation paper fingerprint information described below) from the server and performs the collating process of paper-patterns. The paper fingerprint information acquired from this server is stored in a RAM 302. The process on the collation of the paper-patterns will be described in detail later.

In S1309, the CPU 301 determines whether or not the result of the collation of paper-patterns in S1308 indicates coincidence. If it indicates non-coincidence, then in the process of S1310, the CPU 301 displays on the operating portion that the process of decoding data from the code image is not allowed, and then completes all the processes. If the two pieces of paper-pattern information coincide with each other in the process of S1309, the CPU 301 restores the digital data from the first encoded data (S1306), and in S1307 stores the decoded information or displays the same on the operating portion, and thus completes the processes.

As described above, in this embodiment, according to the third information, the process on decoding is performed. That is, either of the following processes is performed: a process of unconditionally performing the decoding process, or a process in which the collating process is performed and if the collation result indicates coincidence, the decoding process is allowed, and if the collation result indicates non-coincidence, the decoding process is not allowed. Accordingly, an image processing apparatus that can decode according to a request from a user can be provided.

<Paper Fingerprint Information Collating Process>

Figure 14:
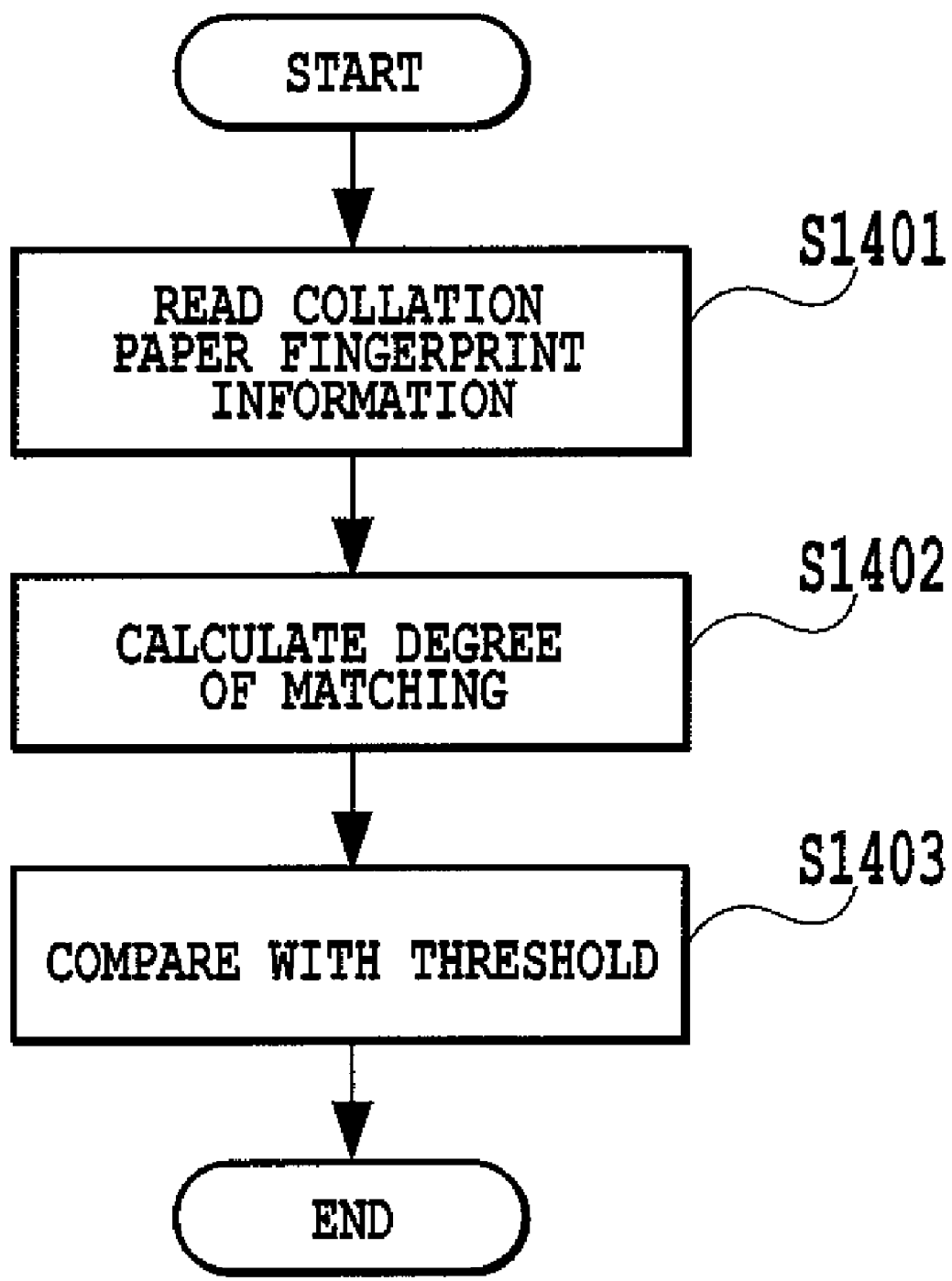
FIG. 14 is a flowchart of a paper-pattern collation process concerning the embodiment of the present invention.

Next, a paper fingerprint information collating process is described with reference to FIG. 14. FIG. 14 is a flowchart showing the paper fingerprint information collating process. Each step of this flowchart is collectively controlled by the CPU 301.

The CPU 301 can read paper fingerprint information, which is sent from the paper fingerprint information acquisition section 507 to the RAM 302 and is read in S1303, and control to collate this read paper fingerprint information with another paper fingerprint information. In addition, the another paper fingerprint information means the paper fingerprint information stored in another storage media, such as a server, and means the collation paper fingerprint information described below.

In S1401, the CPU 301 reads from the RAM 302 the paper fingerprint information (the collation paper fingerprint information) registered in the server.

In S1402, in order to collate the read paper fingerprint information sent from the paper fingerprint information acquisition section 507 (paper fingerprint information to be collated) with the paper fingerprint information read in S1401, the CPU 301 calculates the degree of matching between these two pieces of paper fingerprint information using Equation (1).

This calculation process is for comparing and collating the collation paper fingerprint information with the paper fingerprint information to be collated (the paper fingerprint information sent from the paper fingerprint information acquisition section 507 to the RAM 302).

The collating process is performed between the paper fingerprint to be collated and the collation paper fingerprint using a function shown in Equation (1). Equation (1) expresses a collation error.

[Equation 1]

$$E(i, j) = \frac{\sum_{x,y} \alpha_1(x, y)\alpha_2(x-i, y-j)\{f_1(x, y) - f_2(x-i, y-j)\}_2}{\sum_{x,y} \alpha_1(x, y)\alpha_2(x-i, y-j)} \quad (1)$$

In Equation (1), $\alpha_1$ is mask data in the paper fingerprint information (the collation paper fingerprint information) read in Step 1401. $f_1$ (x, y) denotes grayscale image data in the paper fingerprint information (the collation paper fingerprint information) read in Step 1401. On the other hand, $\alpha_2$ is mask data in the paper fingerprint information (the paper fingerprint information to be collated) sent from the paper fingerprint information acquisition section 507 in Step 1402. $f_2$ (x, y) denotes grayscale image data in the paper fingerprint information (the paper fingerprint information to be collated) sent from the paper fingerprint information acquisition section 507 in Step 902.

In addition, (x, y) of Equation (1) denotes a coordinate serving as a reference in the paper fingerprint information to be collated and the collation paper fingerprint information, and (i, j) denotes a parameter to account for a positional deviation between the paper fingerprint information to be collated and the collation paper fingerprint information. However, in this embodiment, assuming that the positional deviation is in an almost negligible level, the processing will be performed as i=0 and j=0.

Here, in order to consider the meaning of Equation (1), consider the case where i=0, j=0, and $\alpha_1$(x, y)=1 (where, x=0 to n, y=0 to m), and $\alpha_2$(x-i, y-j)=1 (where, x=0 to n, y=0 to m). (n and m denote that the range to collate is an area including horizontally n pixels and vertically m pixels.)

Namely, calculate E(0, 0) when $\alpha_1$(x, y)=1 (where, x=0 to n, y=0 to m), and $\alpha_2$(x-i, y-j)=1 (where, x=0 to n, y=0 to m).

Here, $\alpha_1$(x, y)=1 (where, x=0 to n, y=0 to m) indicates that all the pixels of the paper fingerprint information (the collation paper fingerprint information) sent from a server are bright. In other words, this indicates that there was no color material, such as toner and ink, or no dust on the paper fingerprint acquisition area upon acquisition of the paper fingerprint information (the collation paper fingerprint information) sent from a server.

Moreover, $\alpha_2$(x-i, y-j)=1 (where, x=0 to n, y=0 to m) indicates that all the pixels of the paper fingerprint information (paper fingerprint information sent from the paper fingerprint information acquisition section 507 (the paper fingerprint information to be collated) acquired this time are bright. In other words, this indicates that there was no color material, such as toner and ink, or no dust on the paper fingerprint acquisition area upon acquisition of the paper fingerprint information just acquired.

As stated above, when $\alpha_1$(x, y)=1 and $\alpha_2$(x-i, y-j)=1 hold in all the pixels, Equation (1) is expressed as Equation 2.

[Equation 2]

$$E(0, 0) = \sum_{x=0, y=0}^{n,m} \{f_1(x, y) - f_2(x, y)\}^2 \quad (2)$$

This $\{f_1(x, y) - f_2(x, y)\}^2$ denotes the square value of a difference between grayscale image data in the collation paper fingerprint information and grayscale image data in the paper fingerprint information to be collated. Accordingly, Equation (1) is a sum of the square of a difference in each pixel of two pieces of paper fingerprint information. Namely, the more pixels with $f_1$ (x, y) similar to $f_2$ (x, y), the smaller value this E (0, 0) will take.

<Meaning of $\alpha$>

The numerator of Equation (1) means a result acquired by multiplying $\{f_1(x, y) - f_2(x-i, y-i)\}^2$ by $\alpha_1$ and $\alpha_2$ (precisely speaking, a total sum value is further calculated under $\Sigma$ symbol). $\alpha_1$ and $\alpha_2$ indicate zero for a dark colored pixel, and one for a light colored pixel.

Accordingly, if either one (or both) of $\alpha_1$ and $\alpha_2$ is zero, $\alpha_1\alpha_2\{f_1(x, y) - f_2(x-i, y-i)\}^2$ becomes zero.

That is, this indicates that if a target pixel is dark colored in either one (or both) of the two pieces of paper fingerprint information, the density difference in the relevant pixel is not considered. This is needed to ignore a pixel on which a dust or a color material has been put.

Since this process increases and decreases the number of summation under $\Sigma$ symbol, normalization is performed by being divided by a total sum, $\Sigma\alpha_1$(x, y) $\alpha_2$(x-i, y-j).

In Step 1403, the CPU 301 compares the collation error of the two pieces of paper fingerprint information calculated in Step 1402 with a predetermined threshold and determines whether the collation paper fingerprint and the paper fingerprint to be collated are in "coincidence" or in "non-coincidence".

In this way, the paper fingerprint information (the paper fingerprint information to be collated) extracted in S1303 is collated with the paper fingerprint information (the collation paper fingerprint information) read from a server.

As described above, in this embodiment, an indication of whether or not to allow decoding when decoding a data which is printed as a code image obtained by encoding a digital data recorded on a paper, is also contained as information in a recording medium on which the code image is formed. Accordingly, by determining whether or not a paper-pattern, i.e., information which a recording medium inherently has, is matched even in the case where the decoding is not allowed, it is possible to provide a method of allowing only a person who has a paper, the paper-pattern of which is matched, to perform the decoding process. Accordingly, even if the information contained in the code image is copied onto another paper by a copying operation, the decoding process can not be performed from this code image, and thus security can be increased.

That is, in this embodiment, the second code image, which is the encoded collation information containing the above-described third information, is formed on a recording medium along with the first code image which a user desires to encode. As described above, this third information is the information, which instructs to restore (decode) electronic data from the first encoded data if the result of collation of paper fingerprints determines as coincidence. Accordingly, in the case where the decoding process is performed in an image processing apparatus such as the image forming apparatus 10, if the above-described indication is the information that unconditionally allows the decoding process to be performed, or if the third information is not attached, then the first encoded data is unconditionally decoded. Moreover, if the above-described indication is the information that conditionally allows the decoding process to be performed, the collating process of paper-patterns is performed as described above and only if the paper-patterns are determined to be in coincidence (to be normal), the decoding process is performed.

In this embodiment, the third information can be set so as to reflect a user's intention, so by attaching the third information, the process on the decoding can be performed corresponding to a user's desire. That is, when a user does not want high security in generating a code image, an instruction is made to perform decoding process on the third information unconditionally, thereby allowing the decoding process to be performed regardless of whether an image to be read is an original one or a duplicated one. Moreover, when a user wants high security in generating a code image, the third information is provided as an instruction to perform the decoding process only if a condition is met, thereby allowing the decoding process to be performed only on a user-intended document, such as an original document.

In this way, the third information on allowing the collating process of paper fingerprints to be performed is printed in advance on a recording medium, such as a paper, along with the first code image, thereby allowing the decoding process to be performed only on a document, from which an appropriate paper fingerprint is read, when performing the decoding process from the encoded data to electronic data. Moreover, since the image processing apparatus determines a process on the decoding based on the third information, a user-desired process contained in the third information can be performed, thus improving convenience for a user, as well.

Moreover, by making the third information a command which the image processing apparatus can interpret, an image processing apparatus, such as a digital copying machine, a digital decoder, or a computer such as PC, can carry out even complicated processing.

Incidentally, if a user does not want to increase security in generating a code image in the form of printing the collation paper fingerprint information onto a recording medium, such as paper, the collation paper fingerprint information may not be printed on a recording medium as a document. If a user wants to increase security after creating a document without printing the collation paper fingerprint information in this manner, the collation paper fingerprint information will be overwritten on this created document.

However, in this embodiment, the collation paper fingerprint information is stored in a predetermined storage unit such as a server or the HDD 304, not on a recording medium such as a paper. That is, the collation paper fingerprint information is retained in another location different from the recording medium as a document. Accordingly, even in the case where a user did not want to increase security in generating a code image, but the user wants to increase security after creating the document, the user does not need to perform the above-described overwriting since the collation paper fingerprint, which is to be used in the subsequent collation, is stored in another storage unit different from the document. In this way, even if the need of a user changes, the image processing apparatus can easily respond to this change without carrying out the overwrite process or the like.

Moreover, in this embodiment, based on a location where the collation paper fingerprint information that is added to the second information is stored, the image processing apparatus registers the collation paper fingerprint information in a storage unit such as a server. Accordingly, an address of the paper fingerprint information stored in a storage device within the image processing apparatus, or a storage location of the paper fingerprint information on a server connected via a network can be identified.

Moreover, in this embodiment, the first information on the unique number for identifying a printed paper and the second information for identifying a storage location are printed on a document, so the registration of the collation paper fingerprint information for one document can be performed only once. That is, when attempting to duplicate an already registered document and then register the paper fingerprint information on this duplicated document as the collation paper fingerprint information, the first information and the second information are printed also on the duplicated document. In a location analyzed from the second information, the number contained in the first information is already registered. In this case, by prohibiting the registration of the collation fingerprint information, rewriting of the collation paper fingerprint information can be prevented.

Furthermore, in this embodiment, the collation paper fingerprint information is stored in another storage unit different from a recording medium serving as a document, so that chances that an unintended person acquires the collation paper fingerprint information can be reduced. That is, in the case where the collation paper fingerprint information is encoded and embedded into a recording medium, the collation paper fingerprint information may be extracted by analyzing this recording medium. However, in this embodiment, the collation paper fingerprint information is stored in another storage unit different from the document, such as a server, a RAM, or an HDD, so that it is difficult for the unintended person to easily acquire the collation paper fingerprint information.

Second Embodiment

Figure 15:
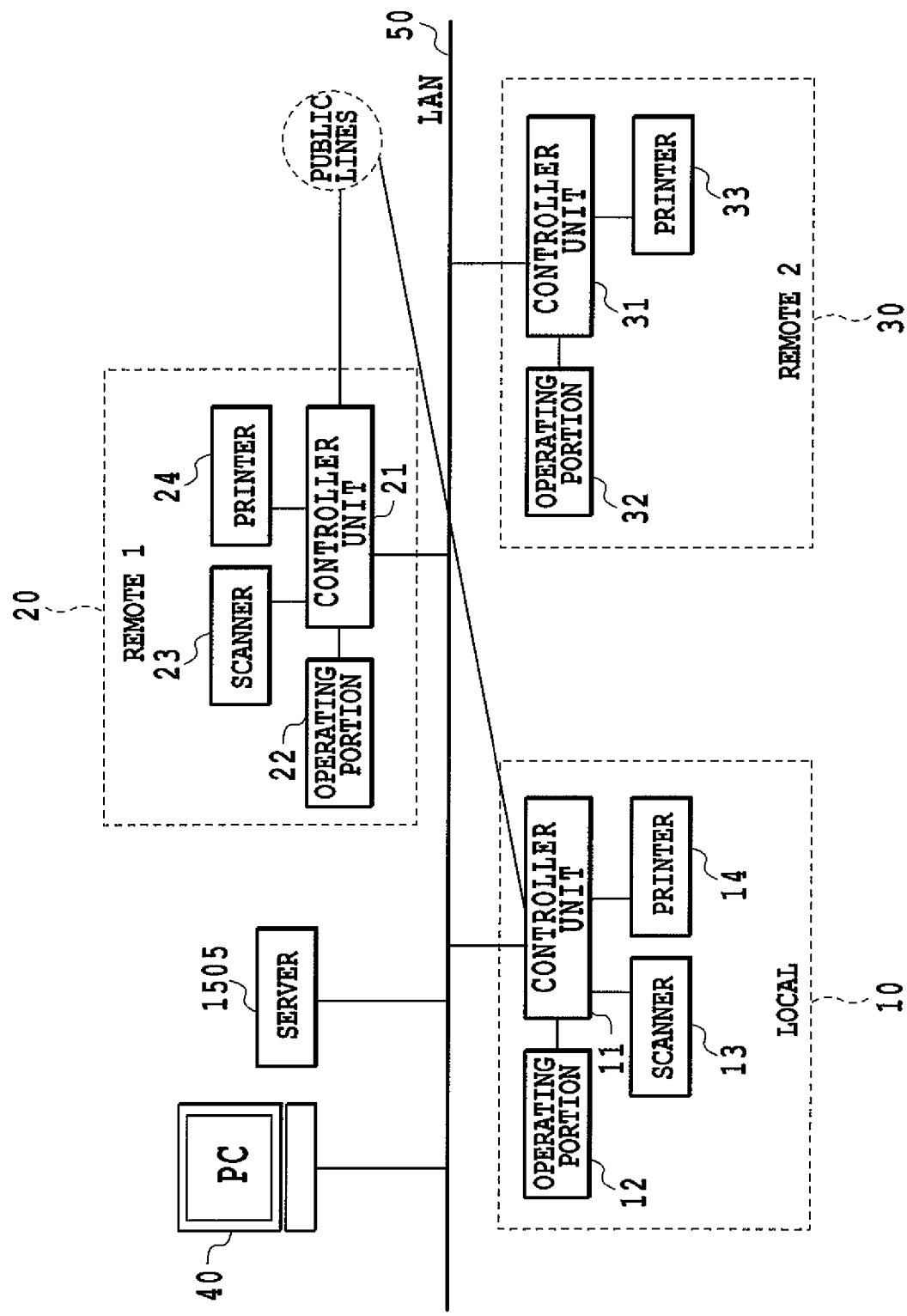
FIG. 15 is a view showing the entire configuration of the image forming system concerning an embodiment of the present invention.

A second embodiment described below differs from the first embodiment in that information on the decoding process is registered in a server 1501 shown in FIG. 15, which is newly added to the network, and in which a user can change the information in the server.

Figure 16:
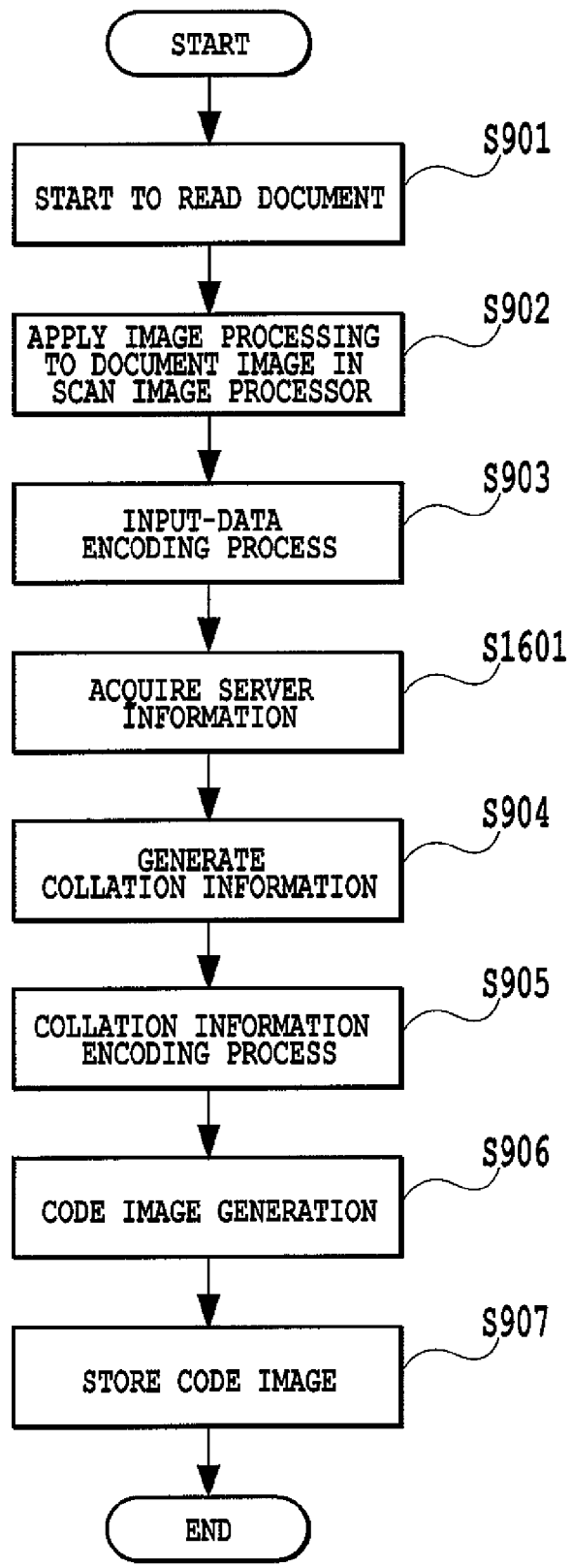
FIG. 16 is a flowchart of a paper fingerprint information registration process concerning the embodiment of the present invention.

With regard to processes in which a user inputs a document, and inputs data to a digital copying machine or a digital composite machine from a host computer, and encodes the input data, a difference from the first embodiment is described using a flowchart of FIG. 16.

The CPU 301 causes a scanner to read an image serving as the document in S901 and performs image processing in S902 and thereafter performs the first encoding to the input data. These points are the same as those of the first embodiment. Next, in the process of S1601, the CPU 301 acquires server identifying information for identifying the location of the server 1501.

In this way, this embodiment features that a process is added, in which the server identifying information on a server as external equipment connected to an image forming apparatus is registered in the image processing apparatus, such as a digital copying machine, a digital decoder, or a computer such as a PC.

For the registration process, various methods can be employed, for example, there is a method, in which the CPU 301 displays on the operating portion a message like "Input the information on a server with which the content of process of code image is to be registered", thus prompting a user to input. That is, the server identifying information is acquired as follows: a user operates the operating portion and enters an IP address of the server 1501, which a user is allowed to use, and a user's login name, password, and the like for the server 1501. Alternatively, a user may enter the above-described IP address, login name, password, and the like from the user's host computer.

In addition, the server identifying information may be input to the image forming apparatus 10 in advance as described above, or may be input each time for each processing.

Next, the CPU 301 generates the collation information (S904), and performs an encoding process on the collation information and the server identifying information acquired in S1601 to prepare the second encoded data (S905, S906). In this embodiment, in addition to the first to third information, the server identifying information is contained in the second encoded data. Next, in S907, the CPU 301 stores the first encoded data and the second encoded data into the HDD 304 or the like.

Figure 17:
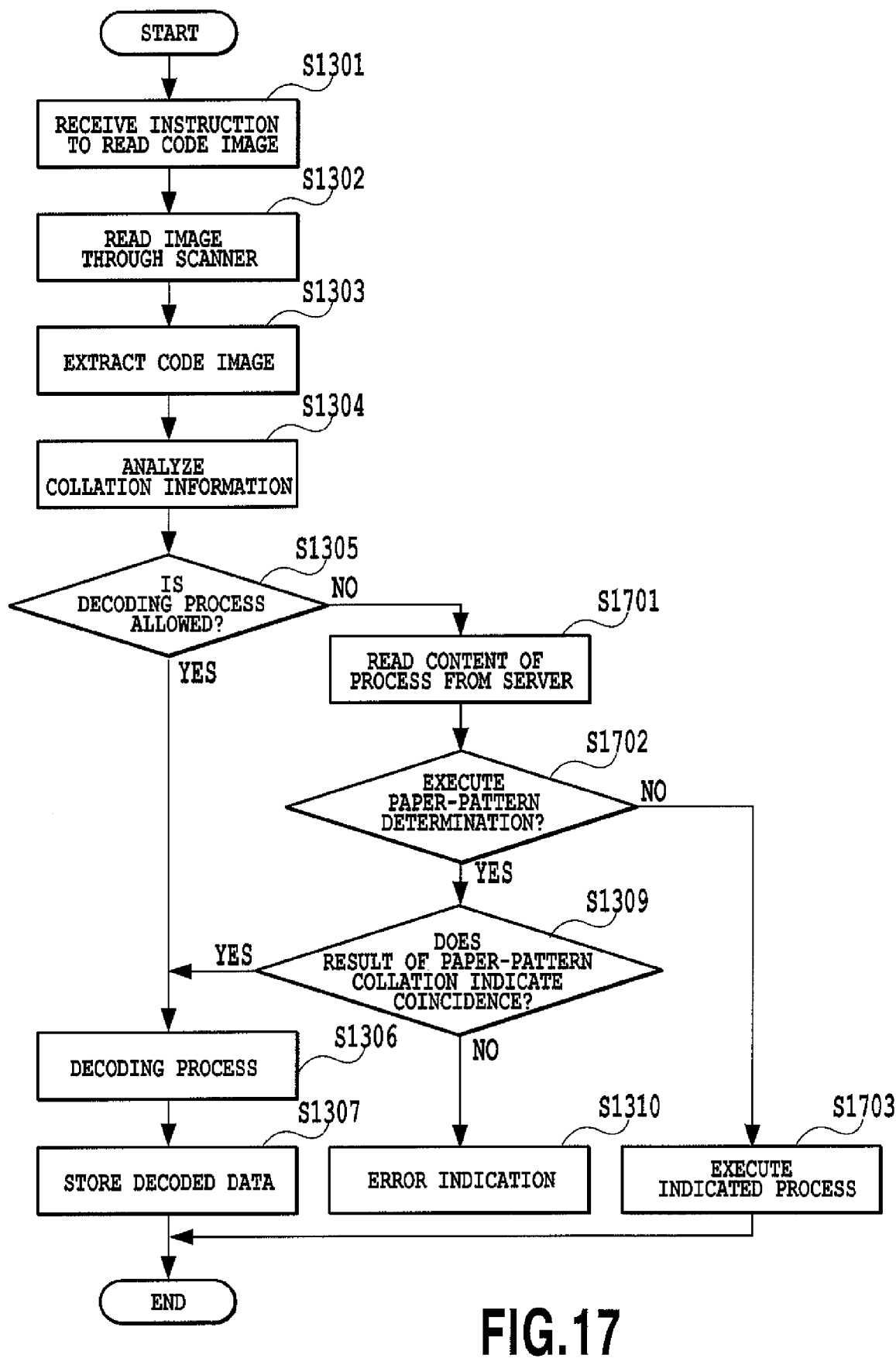
FIG. 17 is a flowchart of a process of decoding code image concerning the embodiment of the present invention.

The process of reading the code image concerning this embodiment is described using the flowchart of FIG. 17.

The flowchart of FIG. 17 differs from the flow of FIG. 13 in that the image forming apparatus 10 reads the content of process from the server 1501 in the process of S1701. The processes from S1301 to S1305 are performed as in FIG. 13, and then if the content of the third information is an instruction for conditionally performing the decoding process, the CPU 301 reads the content of process from the server 1501 in S1701. That is, based on the server identifying information contained in the second encoded data extracted in S1304, the CPU 301 identifies the location of the server 1501 and acquires from the server 1501 the processed content information associated with the contents of the subsequent decoding process, the processed content information being different from the third information.

In S1702, the CPU 301 analyzes the processed content information acquired in S1701 and determines whether or not the above-described contents of process indicate the collating process of the paper fingerprint. If the above-described contents of process indicate the collating process, the CPU 301 proceeds to S1309, and if not indicating the collating process, the CPU 301 proceeds to S1703.

In S1703, the CPU 301 performs the process in accordance with the contents of process acquired by analyzing the above described processed content information.

In this embodiment, the processed content information registered in the server 1501 can be rewritten by a user any time. Even if the contents of process are initially the contents that prohibit the decoding of the code image, afterward the contents of process can be changed to the process that unconditionally allows for the decoding, or the process that allows for decoding if the collating process with the paper-pattern indicates coincidence.

In addition, in this embodiment, in place of the third information, fourth information instructing to access the server 1501 and acquire the processed content information may be used. In this case, the fourth information is generated in S904, and in S1305 the CPU 301 analyzes the fourth information to determine whether or not to access the server 1501 to acquire the processed content information. That is, in this embodiment, the content of process, which the controller unit of the image processing apparatus can interpret, may not be contained in the collation information generated in S904.

As described above, with the fourth information, the image forming apparatus 10 acquires the content of a specific decoding process and performs the process in accordance with this content, so the fourth information serves as the information on the process of restoring electronic data from the first encoded data.

Moreover, in this embodiment, the server identifying information is acquired in S1601, however, if an apparatus for performing code data generating process and an apparatus for performing code information reading process are the same apparatus, there is no need to provide a step of acquiring the server identifying information. In this case, by setting the location information of the server 1501 to the image processing apparatus (the above-described same apparatus) in advance, the CPU 301 can identify the location of the server 1501 in S1701. That is, it is important in this embodiment that the image processing apparatus for performing the code information reading process shown in FIG. 17 recognizes the location of the server 1501, and any method of this recognition may be employed.

Furthermore, in this embodiment, the information on the process of restoring electronic data from the first encoded data, including the processed content information or the like, are stored in the server 1501, however, these may be stored in a storage unit, such as the HDD 304 or the ROM 302 in the image forming apparatus 10.

In this embodiment, an indication of whether or not to allow decoding into the decode image when decoding a data which is printed as a code image obtained by encoding a digital data, and the information on a more complicated process are registered in an information storage unit such as a server. Then, by making this registered content changeable, the processing of the code image contained in a paper can be changed even after this coded image is printed on a paper.

Moreover, by registering the contents of process in a server in advance, even a more complicated process can be registered because more data areas for registration can be taken. That is, all of the complicated processes of a digital copying machine or a digital decoder do not need to be contained in the second encoded data, which is printed on a paper, and the processes to be executed are stored in a server or the like on a network, thereby allowing for a more complicated process to be performed.

Although in this embodiment, it is described that the processing of the code image is registered in a server on a network, the information may be registered even in a host computer on a network, another digital copying machine, a multifunctional apparatus, or even other control equipment.

Moreover, the information may be registered in an apparatus, which is connected to a digital copying machine or a multifunctional apparatus using another means not through a network, or even with the digital copying machine or the multifunctional apparatus itself.

Third Embodiment

In the first and second embodiments, the collation paper fingerprint information is stored in a location such as a server different from a recording medium serving as a document, but not limited thereto, and the collation paper fingerprint information may be retained in a recording medium itself serving as a document. That is, a location for storing the collation paper fingerprint information may be the recording medium.

In this case, in the second information generated in S904, a location where fingerprint information serving as the collation paper fingerprint information is stored may be a recording medium itself serving as a document.

In this embodiment, the paper fingerprint information acquired in S1202 is encoded as the collation paper fingerprint information and is printed on a document read in S1201. In this way, the collation paper fingerprint information will be retained in the recording medium serving as a document.

Accordingly, in S1303, the CPU 301 acquires from the image data read in S1302 the collation paper fingerprint information printed on the recording medium in which the relevant image data is formed.

Fourth Embodiment

The first to third embodiments describe a form, in which the processes characteristic of the present invention shown in FIG. 9, FIG. 12 to FIG. 14, and FIG. 16, FIG. 17 are performed in the image forming apparatus, however, these processes may be performed in a computer such as a PC connected to the image forming apparatus 10 via a network, for example.

In this embodiment, in the code data generation process, in S901 the PC acquires via a network an image serving as a document read by the image forming apparatus 10. The PC performs the same processes as those in S902 to S907 on the image data input this way.

Moreover, in the paper fingerprint information registration process, in S1201 the PC acquires via a network the image data of the document read by the image forming apparatus 10. The PC performs the same processes as those in S1202 to S1206 on the image data input this way.

Moreover, in the code information reading process, prior to S1303 the PC acquires via a network the image data containing the first and second code images acquired by the image forming apparatus 10. The PC performs the same processes as those in S1303 to S1310 on the image data input this way.

Moreover, the PC can carry out the same processes as those of FIGS. 16 and 17 in the same manner as described above.

Other Embodiments of the Present Invention

The present invention can be applied to a system comprised of a plurality of apparatuses (e.g. a computer, an interface device, a reader, a printer, or the like), or may be applied to apparatuses (a multifunctional apparatus, a printer, a facsimile machine, or the like) consisting of one device.

The scope of the above-described embodiments also includes a processing method, in which a program that operates the configuration of the above-described embodiments so as to achieve the functions of the embodiments is stored in a storage medium and the program stored in this storage medium is read as a code and a computer executes this code. That is, computer readable storage media also falls within the scope of the embodiments. Moreover, not only a storage medium, in which the above-described program is stored, but also the program itself falls within the scope of the above-described embodiments.

As such storage medium, for example, a floppy (registered trademark) disk, a hard disk, an optical disk, a magneto-optical disc, CD-ROM, a magnetic tape, a nonvolatile memory card, and ROM can be used.

Moreover, not only those for carrying out processes using only one program stored in the above-described storage medium but also those operating on an OS and executing the operations of the above-described embodiments in conjunction with other software or functions of an extension board also fall within the scope of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-127533, filed May 14, 2007, which is hereby incorporated by reference herein in its entirety.

What is claimed is:

1. An image processing apparatus capable of decoding electronic data from image data including first encoded data generated by encoding said electronic data, and second encoded data generated by encoding information about a process of decoding said electronic data from said first encoded data, said image processing apparatus comprising:

extraction means for extracting, based on said image data, paper fingerprint information of a recording medium from which said image data was read;

analyzing means for analyzing said second encoded data;

collating means for collating said extracted paper fingerprint information with collation paper fingerprint information using a matching degree when it is determined, as a result of analysis by said analyzing means, that a collating process of said extracted paper fingerprint information is required; and allowing means for allowing decoding of said electronic data from said first encoded data when a result of collation by said collating means indicates coincidence between the extracted paper fingerprint information and the collation paper fingerprint information, wherein the matching degree is calculated using a collation error $E(i, j)$ indicated by the following equation:

$$E(i, j) = \frac{\sum_{x,y} \alpha_1(x, y)\alpha_2(x-i, y-j)\{f_1(x, y) - f_2(x-i, y-j)\}_2}{\sum_{x,y} \alpha_1(x, y)\alpha_2(x-i, y-j)},$$

where x=0 to n and y=0 to m, and wherein $\alpha_1$ is mask data in the collation paper fingerprint information, $f_1(x, y)$ denotes grayscale image data in the collation paper fingerprint information, $\alpha_2$ is mask data in the paper fingerprint information to be collated, and $f_2(x, y)$ denotes grayscale image data in the paper fingerprint information to be collated.

2. The image processing apparatus according to claim 1, wherein said information about the process of decoding is information instructing whether to unconditionally perform a decoding process from said first encoded data to said electronic data, or to perform said decoding process only if a condition is met; and when said instruction is an instruction to perform said decoding process only if a conditions is met, said collating means performs said collation.

3. The image processing apparatus according to claim 1, wherein said second encoded data includes third information, which is information different from said information about the process of decoding, for identifying a location of storage means for storing second information about the process of decoding said electronic data from said first encoded data; and said collating means includes means for accessing said storage means based on said third information, acquiring said second information from the storage means, and performing a process according to an instruction included in the second information.

4. The image processing apparatus according to claim 1, wherein said information about the process of decoding is information instructing to access a storage means for storing additional information about the process of decoding said electronic data from said first encoded data, and to acquire said additional information; and wherein said collating means includes means for acquiring, based on said information, said additional information and performing a process according to an instruction included in said additional information.

5. The image processing apparatus according to claim 1, wherein said collation paper fingerprint information is stored in one of an external device connected to said image processing apparatus and storage means included in said image processing apparatus.

6. The image processing apparatus according to claim 5, wherein
said second encoded data further includes information indicating, as a location storing said collation paper fingerprint information, said one of the external device connected to said image processing apparatus and said storage means included in said image processing apparatus; and
said collating means acquires said collation paper fingerprint information from said location based on the information indicating said one of the external device and the storage means.

7. The image processing apparatus according to claim 1, wherein said collation paper fingerprint information is formed in a recording medium from which said image data was read, said image processing apparatus further comprising
means for acquiring said collation paper fingerprint information from said image data.

8. The image processing apparatus according to claim 7, wherein
said second encoded data further includes information indicating, as a location storing said collation paper fingerprint information, a recording medium from which said image data was read; and wherein
said collating means acquires said collation paper fingerprint information from said location based on the information indicating the recording medium.

9. The image processing apparatus according to claim 1, further comprising image reading means for reading an image formed in a recording medium, wherein
said image reading means acquires said image data by reading a recording medium from which said image data was read.

10. A method of controlling an image processing apparatus capable of decoding electronic data from image data including: first encoded data generated by encoding said electronic data; and second encoded data generated by encoding information about a process of decoding said electronic data from said first encoded data, said method comprising the steps of:
extracting, based on said image data, paper fingerprint information of a recording medium from which said image data was read;
analyzing said second encoded data;
collating said extracted paper fingerprint information with collation paper fingerprint information using a matching degree when it is determined, as a result of analysis by said step of analyzing, that a collating process of said extracted paper fingerprint information is required; and
allowing decoding of said electronic data from said first encoded data when a result of collation by said step of collating indicates coincidence between the extracted paper fingerprint information and the collation paper fingerprint information,
wherein the matching degree is calculated using a collation error $E(i, j)$ indicated by the following equation:

$$E(i, j) = \frac{\sum_{x,y} \alpha_1(x, y)\alpha_2(x-i, y-j)\{f_1(x, y) - f_2(x-i, y-j)\}_2}{\sum_{x,y} \alpha_1(x, y)\alpha_2(x-i, y-j)},$$

where x=0 to n and y=0 to m, and wherein
$\alpha_1$ is mask data in the collation paper fingerprint information,
$f_1(x, y)$ denotes grayscale image data in the collation paper fingerprint information,
$\alpha_2$ is mask data in the paper fingerprint information to be collated, and
$f_2(x, y)$ denotes grayscale image data in the paper fingerprint information to be collated.

11. The method of controlling an image processing apparatus according to claim 10, further comprising the step of reading an image formed in a recording medium, wherein
in said step of reading an image, said image data is acquired by reading a recording medium from which said image data was read.

* * * * *